US011161632B2

(12) United States Patent
Dargin, III

(10) Patent No.: US 11,161,632 B2
(45) Date of Patent: *Nov. 2, 2021

(54) REMOVING ORBITAL SPACE DEBRIS FROM NEAR EARTH ORBIT

(71) Applicant: John Francis Dargin, III, Duxbury, MA (US)

(72) Inventor: John Francis Dargin, III, Duxbury, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/707,250

(22) Filed: Dec. 9, 2019

(65) Prior Publication Data
US 2020/0223566 A1 Jul. 16, 2020

Related U.S. Application Data

(63) Continuation-in-part of application No. 16/399,151, filed on Apr. 30, 2019, now Pat. No. 10,501,212.

(60) Provisional application No. 62/835,796, filed on Apr. 18, 2019, provisional application No. 62/664,564, filed on Apr. 30, 2018.

(51) Int. Cl.
*B64G 1/64* (2006.01)
*B64G 1/32* (2006.01)
*B64G 1/24* (2006.01)
*B64G 1/36* (2006.01)

(52) U.S. Cl.
CPC ............ *B64G 1/646* (2013.01); *B64G 1/242* (2013.01); *B64G 1/32* (2013.01); *B64G 1/366* (2013.01)

(58) Field of Classification Search
None
See application file for complete search history.

(56) References Cited

U.S. PATENT DOCUMENTS

| 5,153,407 | A | * | 10/1992 | Schall | B64G 1/56 |
| | | | | | 219/121.6 |
| 5,405,108 | A | | 4/1995 | Marin, Jr. et al. | |
| 2013/0001365 | A1 | * | 1/2013 | Kang | B64G 1/1078 |
| | | | | | 244/158.6 |
| 2014/0367523 | A1 | | 12/2014 | Kitazawa et al. | |
| 2018/0073361 | A1 | | 3/2018 | Assoun | |

FOREIGN PATENT DOCUMENTS

| CN | 103434658 | 12/2013 |
| CN | 106809405 | 6/2017 |

OTHER PUBLICATIONS

International Search Report and Written Opinion issued in connection with corresponding International Application No. PCT/IB2019/053550 dated Sep. 19, 2019.

(Continued)

*Primary Examiner* — Richard G Davis
(74) *Attorney, Agent, or Firm* — Womble Bond Dickinson (US) LLP; John J. Penny, Jr.

(57) ABSTRACT

A system utilizing an antenna generating an electromagnetic (EM) wave to interact with a solar EM wave to streamline magnetic flux in the polar cusp and to facilitate the flow of solar plasma through the Polar Cusp, resulting in an elevated plasma flux at the exit of the Polar Cusp. The elevated plasma flux intercepts and removes small space debris from Low Earth Orbit (LEO), Geosynchronous Earth Orbit (GEO) and Geosynchronous Transfer Orbits (GTO) transiting the LEO altitude regimes.

13 Claims, 14 Drawing Sheets

(56) References Cited

OTHER PUBLICATIONS

International Preliminary Report on Patentability issued in International Application No. PCT/IB2019/053550 dated Nov. 3, 2020.
First Office Action dated Jun. 1, 2021, in Chinese Application No. 2019800434603, with English translation.

* cited by examiner

| Parameter | Solar Wind | Polar Cusp Exit | Space Debris (2 cm) in 500 km orbit |
|---|---|---|---|
| Mass Flow (M) | $6.76 \times 10^{-3}$ kg/sec | $0.324 \times 10^{-3}$ kg/sec | -- |
| ½ Mass Flow Prior to Northern Polar Cusp | $3.38 \times 10^{-3}$ kg/sec | -- | -- |
| Cross - Section Area | $1.28 \times 10^{12}$ m² | $0.129 \times 10^{12}$ m² | -- |
| ½ Area at entrance to Northern Cusp | $0.64 \times 10^{12}$ m² | -- | -- |
| Dynamic Pressure (P) | 1.84 nPa | 0.251 nPa | -- |
| Force (F) | 2360 N | 32.4 N | 0.059 N |

FIG 13

REMOVING ORBITAL SPACE DEBRIS FROM NEAR EARTH ORBIT

The present application is a Continuation-In-Part of U.S. patent application Ser. No. 16/399,151 filed Apr. 30, 2019, now U.S. Pat. No. 10,501,212 issued Dec. 10, 2019, which claims the benefit of U.S. Provisional Application Nos. 62/664,564 filed Apr. 30, 2018 and 62/835,796 filed Apr. 18, 2019. The entire contents of this application is incorporated herein by reference in their entirety.

TECHNICAL FIELD

The present disclosure relates generally to systems and methods for removing small debris from near-Earth obits.

BACKGROUND OF THE INVENTION

There have been numerous articles and technical papers on the dangers of operating in Low Earth Orbit (LEO) at altitudes between 160 km and 2000 km (0.03-0.3 $R_E$) with the threat of collision with countless small and large orbital debris. This debris occupies LEO and extends out to Geostationary Earth Orbit or Geosynchronous Earth Orbit (GEO) at a circular orbit of 35,786 km (5.6 $R_E$) above the Earth's equator. There are various inclinations and altitudes defining operational satellite orbits in proximity with a multitude of space debris. This space junk is comprised of derelict satellites, rocket bodies, and metal fragments from explosions or collisions. There are many other numerous small detectable or in many cases undetectable particles such as nuts, bolts, paint chips, gloves, etc. In one study conducted by the US Air Force, the Long Duration Exposure Facility (LDEF) was launched on board Space Shuttle Challenger in 1984. It was placed in a 477-km orbit at a 28.5° inclination and operated for 5.7 years. It contained 57 experiments. LDEF was the size of a school bus and configured as a 12-sided cylinder designed to have one long side exposed in the direction of the velocity vector at all times. LDEF was launched not only to accomplish science objectives in materials, electrical power, propulsion and electronics but to also characterize the impacts from orbital debris and natural meteoroids. In the final analysis, over 30% of the impact damage was from space debris. In total, there were over 34,000 impacts of 50 μm diameter or greater. Tracking of the space debris is currently managed by the Air Force Joint Space Operations Center (JSpOC). The JSpOC monitors space debris greater than 10 cm in diameter and is currently tracking more than 8,500 objects. Estimates on the amount of debris less than 10 cm, range from 500,000 and up.

Space debris de-orbits over time due to increased drag forces as the orbital velocity of the debris slowly decays with increasing contact with the Earth's upper atmosphere. This takes many months or years and studies have shown that natural decay will not keep pace with the growing amount of space debris. In fact, we may be reaching a point where additional debris will result in a cascading effect of collisions generating more debris. There are numerous examples of high-speed collisions in low Earth orbit between satellites and with the space shuttle. From a NASA report (Protecting the Space Shuttle from Meteoroids and Orbital Debris) when the Space Shuttle is in a 51.6° inclination and 400 km altitude orbit, NASA's model of the debris environment predicts an average collision velocity of 9 km/s for orbital debris with a diameter of 1 cm or more.

Another study initiated via an official Inter-Agency Space Debris Coordination Committee (IADC) Action Item 27.1, Stability of the Future LEO Environment, was conducted by six IADC member agencies to investigate the projected growth of the LEO debris population. Each concluded independently that active satellite management and debris removal, including the 25-year rule, is necessary to prevent collisions in the future. As quoted from an executive summary from the IADC " . . . Results from the six different models are consistent with one another, i.e., Even with a 90% compliance of the commonly-adopted mitigation measures, based on the ESA provided initial population of 2009, the LEO debris population is expected to increase by an average of approximately 30% in the next 200 years. Catastrophic collisions will continue to occur every 5 to 9 years. Remediation measures such as active debris removal should be considered to stabilize the future LEO environment."

The Kessler Syndrome which helps to explain these phenomena is defined as the numerical growth of satellites and other space objects in orbit to a point where a collision with space debris will generate more debris particles which will then result in more collisions and so on until near Earth orbit becomes unusable. Many of the orbital space debris removal techniques to date have involved the use of a Satellite for delivery of a device or material and are required to operate in the same orbits as the debris. Some of these concepts include a collecting device or net for small debris, a tether or grappling device for larger objects, a laser beam targeting system, a dust injection system, or atmospheric gas injection system. Many involve high mass and energy systems that would contribute to the existing debris and become part of the problem. Some concepts have approached the problem with the intent to slow the orbital speed of the debris in such a way that it de-orbits over time but primarily rely on natural forces to eventually remove the debris over time which could take many years.

The problem will require a global plan that targets not only large debris objects but also includes smaller debris fields as well. This plan must be integrated to address all large and small debris regardless of the nation of origin and coordinated with and agreed to by all spacefaring nations. Financial support can be raised as an international tax on spacefaring nations by setting a tax rate based on the number of satellites placed in orbit by a given nation. Future satellite launches could be taxed based on the complexity of the satellite and record of prior compliance with existing debris mitigation requirements. A well-coordinated program could then be implemented in phases based on a study addressing operational interference, operational priority and/or potential risk determined by a board of international experts.

BRIEF SUMMARY OF THE INVENTION

Systems and methods for removing small debris from near-Earth orbit are disclosed. In one example of a system according to the present disclosure, a satellite is configured to receive, from a solar plasma sensor (SPS), parameters of a solar electromagnetic (EM) wave and a solar plasma. The satellite is further configured to receive, from a space debris sensor (SDS), parameters of targeted debris. The satellite, configured to be positioned at an entry point of a polar cusp, includes an antenna configured to direct a local EM wave to interact with the solar EM wave at the entry point of the polar cusp. The satellite further includes control systems to control the orientation of the antenna and to select parameters of the local EM wave to convert a turbulent magnetic flux of the solar EM wave to a laminar magnetic flux, where a component of solar plasma is directed into the polar cusp in a uniform flow that maximizes a plasma flux at an exit point of the polar cusp to intercept targeted space debris.

In one example of a method according to the present disclosure, a satellite is positioned over an entry point of a polar cusp. The satellite receives, from a solar plasma sensor, parameters of a solar electromagnetic (EM) wave and a solar plasma. An antenna of the satellite directs a local EM wave to interact with the solar EM wave at the entry point of the polar cusp. Control systems of the satellite select parameters of the local EM wave to convert a turbulent magnetic flux of the solar EM wave to a laminar magnetic flux, wherein a component of the solar plasma is directed into the polar cusp in a uniform flow that maximizes a plasma flux at an exit point of the polar cusp to intercept targeted space debris.

BRIEF DESCRIPTION OF THE DRAWINGS

For a more complete understanding of various embodiments, reference is now made to the following detailed description taken in connection with the accompanying drawings in which like identifiers correspond to like elements:

FIG. 13 is a Summary Table illustrating key parameters showing the pressure force available from the free stream solar wind flow and the normal pressure force through the Polar Cusp.

DETAILED DESCRIPTION

Figure 1:
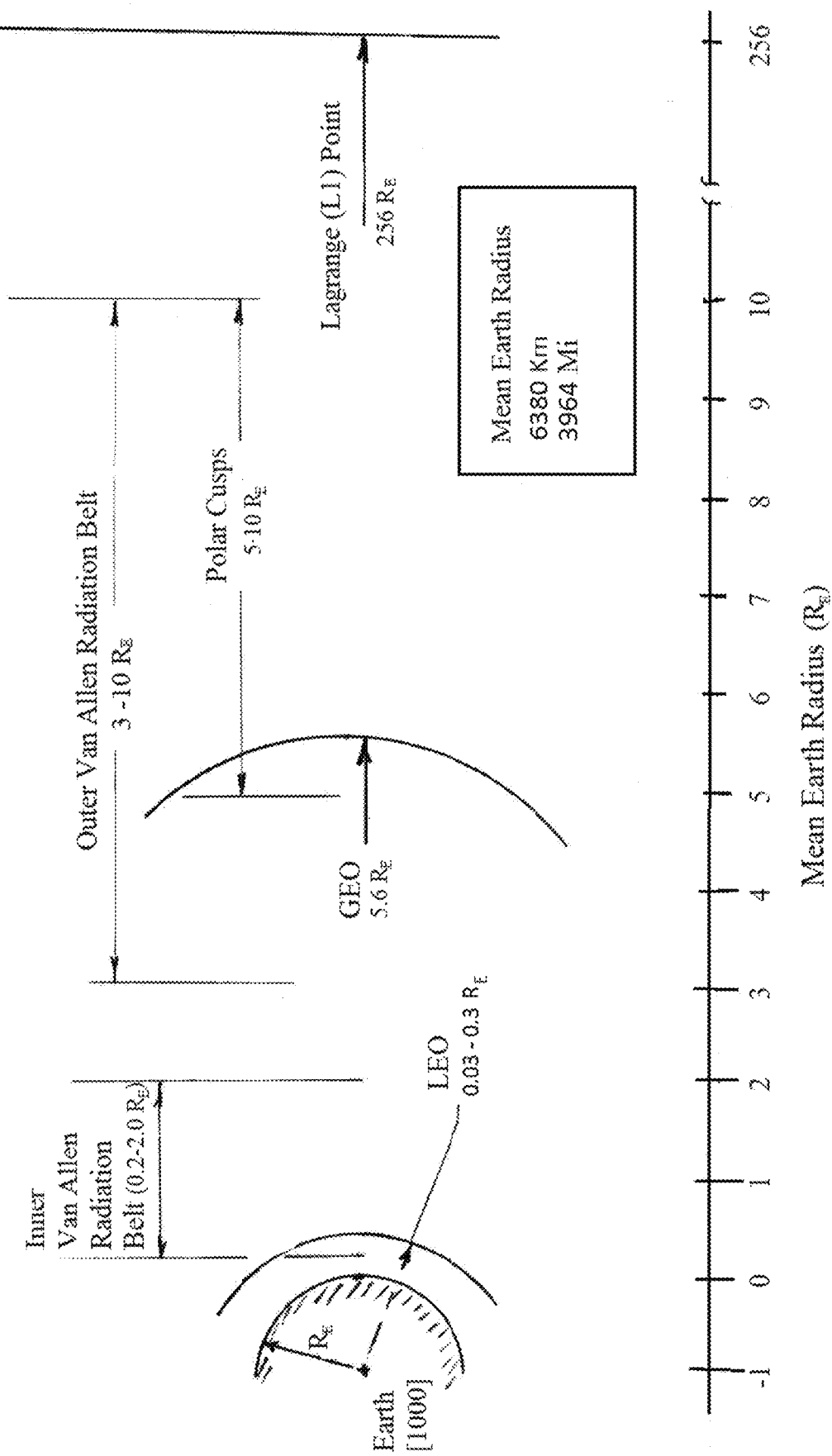
FIG. 1 illustrates various near-Earth locations in terms of Mean Earth Radius ($R_E$) to indicate relative distances in the near-Earth environment.

This invention embodies an alternative concept to remove small space debris from near Earth orbits and addresses the previously stated problem. The Low Earth Orbit (LEO) is defined as an altitude less than 2000 km with the most concentrated altitudes ranging from 450 km to 1000 km. Within the LEO altitude range are many satellites having inclinations crossing near the poles between 80° and 110°. Within a tighter band, are the more concentrated satellites in a Sun Synchronous Orbit (SSO) with inclinations between 96.5° and 102.5°. A SSO (also called a heliosynchronous orbit), as defined by Wikipedia, is a geocentric orbit that combines altitude and inclination in such a way that the satellite passes over any given point of the planet's surface at the same local solar time. Other satellites operate at various inclinations from equatorial to polar to retrograde (inclination angle is greater than 90°) and range from circular (eccentricity=0) to highly elliptical (eccentricity greater than zero and less than one). Debris fields in elliptical orbits would have a Perigee altitude within the LEO altitude range and Apogee well above LEO. There are currently over 20,000 satellites operating between LEO and Geosynchronous Earth Orbit (GEO) with inclinations ranging from equatorial or 0° to polar at 90° and up to 110°. The GEO is defined as an altitude range between 32,000 km and 37,000 km and a near circular orbit. On a larger scale, distances can be given as a multiple of the Mean Earth Radius ($R_E$), where 1 $R_E$=6380 km. FIG. 1 presents a sketch of various near-Earth locations measured in $R_E$ to show relative distance in the near-Earth environment.

The systems and methods described herein provide a means to eliminate from orbit the debris generated by satellite collisions with other inoperative satellites or small pieces of space junk. The PRRISM (Platform for Redirecting and Removing Inert Space Material) Satellite would be launched using a commercial launch vehicle and placed at a location determined by test to be the optimum and most efficient location to intercept and interact with the solar wind on the day side, ahead of the northern and southern Polar Cusps at about 10 $R_E$. Scientific studies of the solar plasma emanating from the sun have shown that the flow spirals outward from the sun in a flow pattern illustrated in FIG. 2, which is often referred to as the "Parker Spiral," at two distinct speeds and with an electrical charge distributed in a toroidal wave that reaches the Earth with a balanced electrical charge. The solar plasma is composed of 96% protons, 4% He+ ions, minor constituents plus an adequate number of electrons for a balanced charge. Within the solar wind is contained the solar plasma of electrically charged particles (E field) and the interplanetary magnetic field (IMF) or B field, which are mutually perpendicular and perpendicular to the direction of flow. However, the solar wind and the solar plasma terms may be used interchangeably throughout this paper. Alfvén waves (a type of magnetohydrodynamic wave) embedded within the high-speed solar plasma have a wide range of periods/frequencies. Only those with periods longer than 8 minutes can affect the auroral regions of the Earth (where the Aurora *Borealis* is generated). The low speed plasma has been recorded at 350 km/s originating from the Sun's equatorial region, while the high speed plasma has been estimated at 800 km/s and emanating from the solar polar regions at latitudes above 30°. These plasma dense current sheets have been recorded with stronger polar magnetic fields and redistributed as the solar wind flows outward, reportedly achieving a near uniform magnetic field distribution by about five solar radii. Solar cycles with Coronal Mass Ejection (CME) activity will likely effect solar wind speed, magnetic field, and electrical charge. CME can be defined as a giant cloud of solar plasma drenched with magnetic field lines that are blown away from the Sun during strong, long-duration solar flares and filament eruptions." Other science reports describe the solar wind differently. According to Borofsky, the solar wind is sometimes referred to as "magnetic spaghetti" (J. E. Borofsky, "The spatial structure of the oncoming solar wind at Earth and the shortcomings of a solar-wind monitor at L1", J. of Atmospheric and Solar-Terrestrial Physics, Vol 177, pp 2-11, Elsevier Ltd, 2018). This is where thin current sheets form the boundaries of the flux tubes and separate one flux tube from the next in various diameters from 35 $R_E$ to greater than 100 $R_E$.

We also know from Maxwell's equations that a changing electrical field produces a magnetic field and a changing magnetic field produces an electrical field. Further, accelerating electric charges generate electromagnetic waves. Data from the Hawkeye science mission were recorded during polar cusp crossings of between 5 to 10 $R_E$ at the northern cusp and between 1.1 and 2.0 $R_E$ for the southern cusp. According to Gurnett and Frank (D. A. Gurnett and L. A. Frank, "Plasma Waves in the Polar Cusp: Observations From Hawkeye 1", *Journal of Geophysical Research*, vol. 83, no. A4, pp. 1447-1462, April 1978), the ULF-ELF magnetic field noise from about 1.78 to 178 kHz is the primary plasma wave phenomena and a reliable indication of the polar cusp. Contained within the solar wind are both electrical and magnetic fields. The changing electrical field along with the changing magnetic field contributes to the strong electromagnetic wave moving outward from the Sun at the two distinct speeds of ~350 km/sec and ~800 km/sec. As this EM wave approaches the Earth's geomagnetic field, a strong reconnection process occurs that disturbs the flow and reduces energy levels within the polar cusp. Hawkeye measurements of the electric field within the polar cusp revealed values of 1 to 5 mV per meter. In contrast, an electric field measurement of the free stream solar wind upstream of Earth is $1 \times 10^3$ V per meter. A sufficient force with constructive interference is required to resonate with the electromagnetic field in the polar cusp to reduce turbulence, allowing an increase in the force of the now laminar flow to intercept with the targeted debris. A means of frequency matching and pulsing of the EM wave with a parabolic antenna to achieve laminar flow through the Polar Cusp is necessary to improve the flow rate and ultimately the force output from the polar Cusp. Using the source-free Maxwell's equations $$\nabla \times E = -\partial B/\partial t \text{ for a changing magnetic field}$$

$$\text{and } \nabla \times H = \partial D/\partial t \text{ for a changing electrical field}$$

where E and H are the electric and magnetic field intensities, measured in units of volts/m and amperes/m, respectively; D and B are the electric and magnetic flux densities and are in units of coulomb/m$^2$ and weber/m$^2$ respectively.

The force on a charge q moving with velocity v in the presence of an electric and magnetic field E, B is called the Lorentz force and is given by:

$$F = q(E + v \times B)$$

For an electromagnetic wave moving through a vacuum, the constitutive relation of the electric and magnetic flux densities D, B are related to the field intensities E, H in the simplest form:

$$D = \varepsilon_o E$$

$$B = \mu_o H$$

where $\varepsilon_o$ and $\mu_o$ are the permittivity and permeability of vacuum with numerical values:

$$\varepsilon_o = 8.854 \times 10^{-12} \text{ farad/m}$$

$$\mu_o = 4\pi \times 10^{-7} \text{ henry/m}$$

Accordingly, the net force on a moving charge exerted by a time-varying electromagnetic (EM) field is proportional to the magnitude and polarity of the charge, the velocity of the charge, the magnitude, direction and polarization of the EM field, and the frequency of the EM field. These principles are used to focus and accelerate charged particles in particle accelerators such as linear accelerators and cyclotrons. The EM field parameters required to manipulate a specific charge (a solar plasma ion or electron) can be determined by closed form calculation, multi-physics finite element modeling, or by experimentation. While charged plasma particles might have a bearing on eliminating turbulence within the polar cusp, Korth, Echer, et al concluded in their paper titled "The response of the solar cusp to a high-speed solar wind stream studied by a multi-spacecraft wavelet analysis" (J. of Atmospheric and Solar-Terrestrial Physics, Vol 177, pp 2-11, Elsevier Ltd, 2018), that the interplanetary magnetic field (IMF) fluctuations are more important than the variations in the solar wind for transferring energy into the polar cusp. Further, Borofsky, in his paper titled "The spatial structure of the oncoming solar wind at Earth and the shortcomings of a solar wind monitor at L1," describes the solar wind as "magnetic spaghetti" where the magnetic flux tubes are surrounded by electrically charged sheets of solar plasma with thicknesses of 1000 to 2000 km. Borofsky further explains that these magnetic flux tubes can be from 35 $R_E$ up to and greater than 100 $R_E$ in diameter, and are oriented with the Parker spiral at about a 45° angle to the Sun-Earth line. He also points out that it can take about 20 minutes for one magnetic flux tube to interact with the Earth's geomagnetic field before a 2nd flux tube arrives with possibly a different set of electromagnetic parameters.

It will be appreciated, for any given set of EM field parameters, that the force exerted on positively charged particles will be equal and opposite to the force exerted on negatively charged particles, on a per unit charge basis. In one example, the EM field parameters may be used advantageously to direct positively charged solar plasma ions (e.g., H$^+$ and He$^{++}$) into the polar cusp and to deflect negatively charged electrons, relying on the relatively high mass of the ions to carry higher momentum (mass×velocity) and kinetic energy (½×mass×velocity$^2$) to intercept the orbital debris. In another example, the EM field parameters may be used advantageously to direct the negatively charged electrons into the polar cusp and to deflect the positively charged ions, relying on the relatively low mass of the electrons to impart higher velocities to carry higher momentum (mass×velocity) and kinetic energy (½×mass×velocity$^2$) to intercept the orbital debris. In some examples, without limitation, the EM field parameters may be selected to create a linear, laminar flow of the selected component (ions or electrons) of the solar plasma, or a spiral laminar flow of the selected component (ions or electrons) of the solar plasma.

Now we calculate the unimpeded free-stream solar wind mass flow, dynamic pressure, and force to determine the pressure force that could be available to provide sufficient force to remove space debris from low Earth orbit. First, looking at the solar wind mass flow, we take the cross-sectional area of the IMF as in FIG. 3. Using 10 km as the thickness per Wikipedia and then taking the width as 2×10 $R_E$, with 1$R_E$=6380 km we have the Area as:

$$\text{Area} = 2 * 10 R_E \lambda 10 \text{ km}$$

$$\text{Area} = 1.28 \times 10^{12} \text{ m}^2$$

Figure 4:
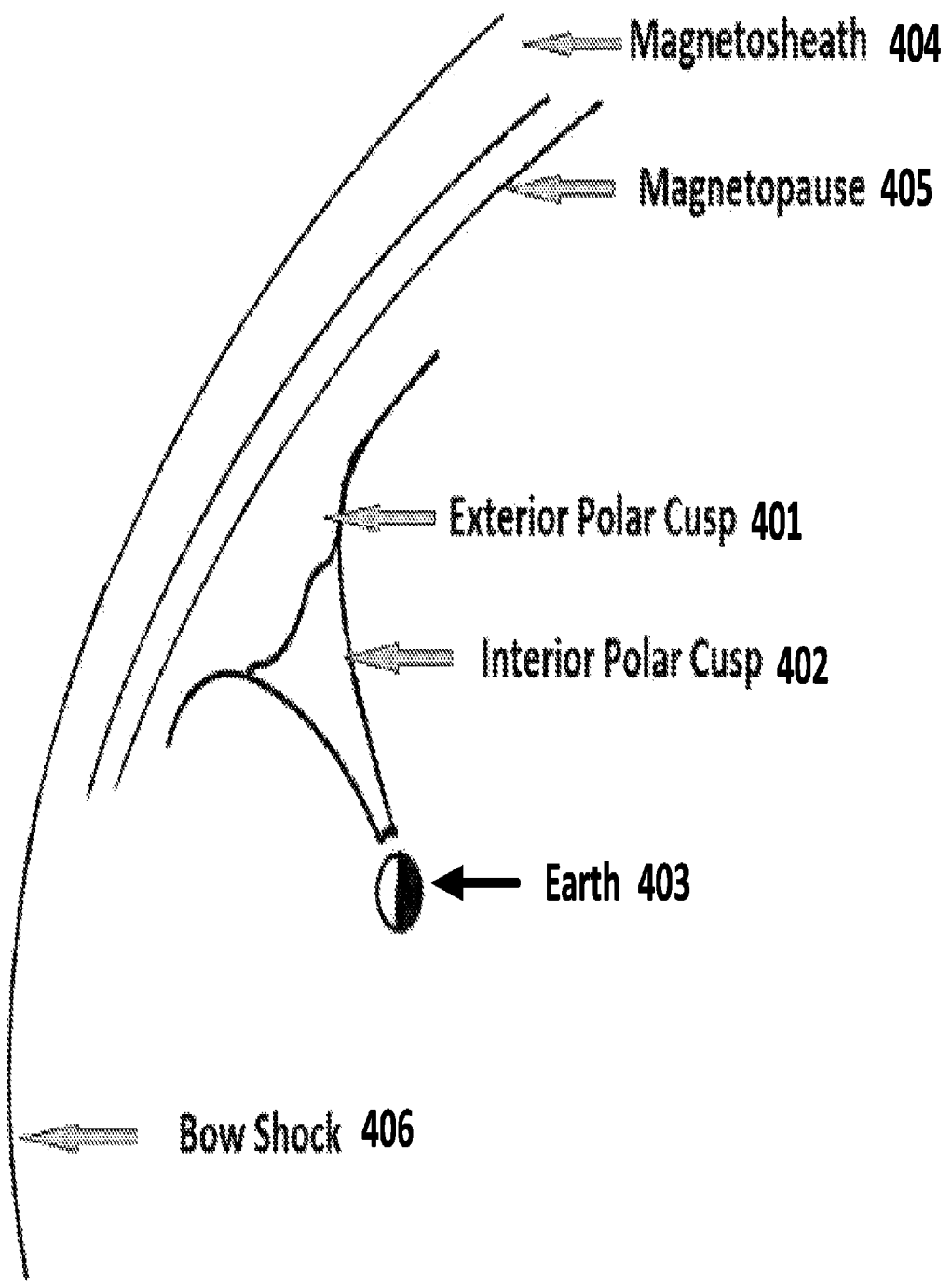
FIG. 4 is a representation of the exterior and interior of the Polar Cusp.

Solving for the Mass flow $(M) = \rho * A * v$ where $\rho$=proton mass (m$_p$) kg*protons (n$_p$) cm$^{-3}$ $m_p = 1.673 \times 10^{-27}$ kg and $n_p = 9$ cm$^{-3}$ A=cross section Area of the freestream solar wind=$1.28 \times 10^{12}$ m$^2$ v=slower solar wind speed=350 km/sec M=$6.76 \times 10\text{-}3$ kg/sec The Dynamic Press $(P) = m_p * n_p * v_p^2$ where $m_p = 1.673 \times 10^{-27}$ kg $n_p = 9$ cm$^{-3}$ $v_p = 350$ km/sec $P = 1.673 \times 10^{-27}$ kg $* 9 \times 10^6$/m$^3$ $* 1.225 \times 10^{11}$ m$^2$/sec$^2$ $P = 1.84$ nPa The Free-stream Solar Wind Force $(F)$=Dynamic Pressure $(P)$*Area $(A)$ F=2360 Newtons As the solar wind approaches the Polar Cusps, observations from the IMP-8 and Hawkeye satellites have shown that there are two significant areas defining the Polar Cusp: the external Polar Cusp area 401 and the internal Polar Cusp area 402 above the Earth 403, as seen in FIG. 4. Also illustrated in FIG. 4 are the magnetosheath 404, the magnetopause 405, and the bow shock 406. The bow shock forms at the boundary between the Earth's magnetosphere and the solar plasma. The magnetopause is the balance between the dynamic pressure of the solar wind and the force exerted on the solar wind by the Earth's magnetic field. The magnetosheath is the region of space between the magnetopause and the bow shock.

Observations from Hawkeye plasma, magnetic field, and plasma wave instruments have directly sampled the throat of the northern Polar Cusp. The interplanetary magnetic field was observed to change from Southward to Northward on Jul. 3, 1974. There were 2 distinct regions identified based on magnetic field plasma flow and magnetic and electric noise. Based on the data, the dominant factor determining the initial location of reconnection and evolution of the reconnected flux is the orientation of the IMF. The IMF orientation (Southward or Northward) at the magnetopause is more important than variations in solar wind speed for setting the initial location for flux tube reconnection. It's important to note that as the density in the Polar Cusp increases, the greater the force will be on the space debris. In addition, the solar wind Alfvén waves within the Parker spiral affect the magnetospheric dayside cusp density and heat the cusp. The proton density in the solar plasma is unchanged at 9 per cubic centimeter until below 4 $R_E$ when the density increases deeper into the cusp. Furthermore, the energetic population within the Cusp is composed of both ionospheric (O$^+$) ions, (which indicate turbulent flow with an upward flow from the ionosphere) and solar wind (He$^{++}$, O$^{>+3}$). Based on data from the Hawkeye science mission, it was observed that the flow in the exterior and interior Polar Cusp is turbulent. In the exterior cusp, the mean flow velocity is 300 km/s dawnward (Earth's rotation is counter-clockwise as indicated in FIG. 4), whereas, the Magnetosheath flow is 200 km/s Northward. In the interior cusp, the solar plasma is 200-300 km/s dusk to dawn with slight direction changes from poleward to the equator. Hence, the data shows that within the exterior cusp the magnetic field components change from those in the Magnetosheath and become more variable. Once entering the Cusp, the bulk flow becomes disturbed from the steadier flow in the Magnetosheath.

Figure 5:
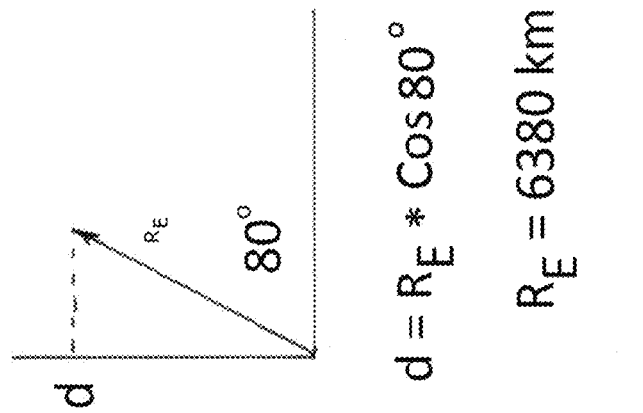
FIG. 5 is a graphical representation of the estimated exit area of the Polar Cusp in the Ionosphere.
Figure 5:
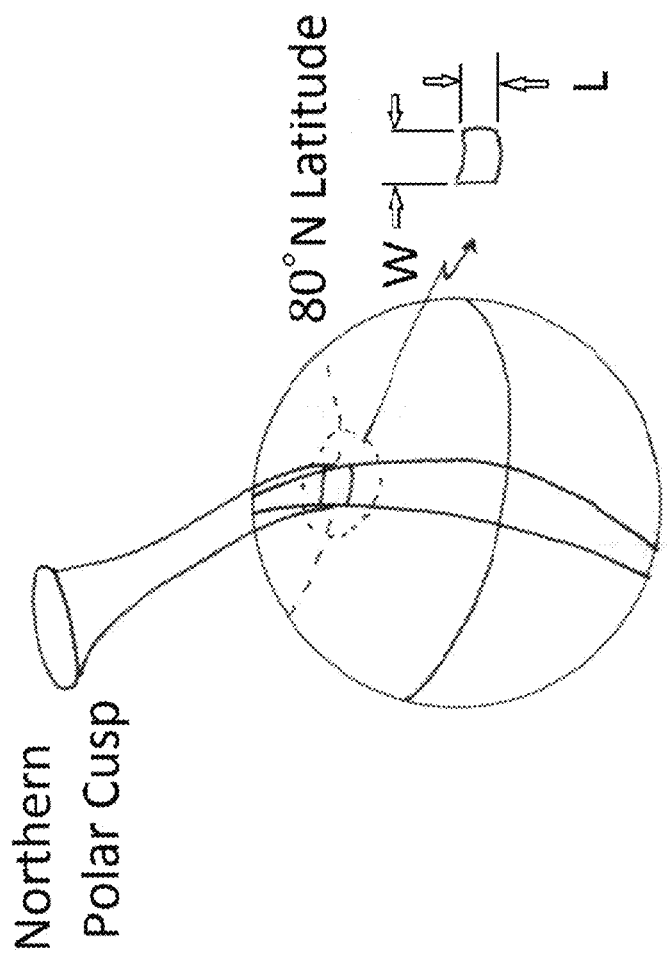

The calculation for the normal solar wind flow through the Polar Cusps requires estimates for calculating the Mass flow (M), Dynamic Pressure (P) and Solar Wind Force (F) that could be applied against the targeted debris in Low Earth Orbit. As shown in FIG. 5 and using data from Maynard (N. C. Maynard, "Coupling the Solar-Wind/IMF to the Ionosphere Through the High Latitude Cusps", Surveys in Geophysics, (2005) 26:255-280, Springer 2005) where he states "In the Ionosphere the cusp is several hours wide and several degrees in depth", the exit area of the Cusp would be represented by length (L) of 2° of north latitude from 79° to 81°. The width (W) would be 2/24 hours on the circumference at 80° north latitude.

$$\text{Area} = L * W$$

$$L = \Delta 2° \text{ at } 80° \text{ N Latitude } (79°\text{-}81°) \text{ where } R_E = 6380 \text{ km,}$$
$$= Cir * (2°/360°)$$
$$= 2\Pi * R_E * (2°/360°)$$
$$L = 0.223 \times 10^6 \text{ m}$$
$$W = 2/24 \text{ hours at } 80° \text{ North Latitude}$$
$$= (2/24) * 2\Pi R_E \cos 80°$$
$$W = 0.580 \times 10^6 \text{ m}$$
$$\text{Area} = 0.223 \times 10^6 \text{ m} * 0.580 \times 10^6 \text{ m}$$

Area of the Cusp exit $(A) = 0.129 \times 10^{12}$ m$^2$

The Mass flow (M) is calculated with the following values:

$$M = \rho * A * v$$

Where $\rho = m_p * n_p$ $m_p = 1.673 \times 10^{-27}$ kg; mass of a proton $n_p = 15$ cm$^{-3}$; number concentration of protons Area=$0.129 \times 10^{12}$ m$^2$ Velocity (v)=100 km/sec $$M_{cusp} = 1.673 \times 10^{-27} \text{ kg} * 15 \text{ cm}^{-3} * 0.129 \times 10^{12} \text{ m}^2 * 100 \text{ km/sec}$$

The Mass flow at the Cusp Exit is:

M=$0.324 \times 10^{-3}$ kg/sec

The Dynamic Pressure (P) through the Polar Cusp:

$$P = m_p * n_p * v_p^2$$

where $m_p = 1.673 \times 10^{-27}$ $n_p = 15$ cm$^{-3}$ $v_p = 100$ km/sec $$P = 1.673 \times 10^{-27} \text{ kg} * 15 \text{ cm}^3 * (100 \text{ km/sec})^2$$

P=$0.251 \times 10^{-9}$ kg/m-sec$^2$

The Dynamic Pressure (P) at the Cusp Exit is:

P=0.251 nPa

The Estimated Normal Solar Wind Force (F) at the Cusp exit is:

$$F = \text{Dynamic Pressure}(P) * \text{Area of the Cusp Exit}(A)$$
$$P = 0.251 \times 10^{-9} \text{ kg/m-sec}^2$$
$$A = 0.129 \times 10^{12} \text{ m}^2$$
$$F = (0.251 \times 10^{-9} \text{ kg/m-sec}^2) * (0.129 \times 10^{12} \text{ m}^2)$$
$$= 0.0324 \times 10^3 \text{ kg-m/sec}^2$$

The Estimated Normal Solar Wind Force (F) at the Cusp exit is:

F=32.4 Newtons

Figure 6:
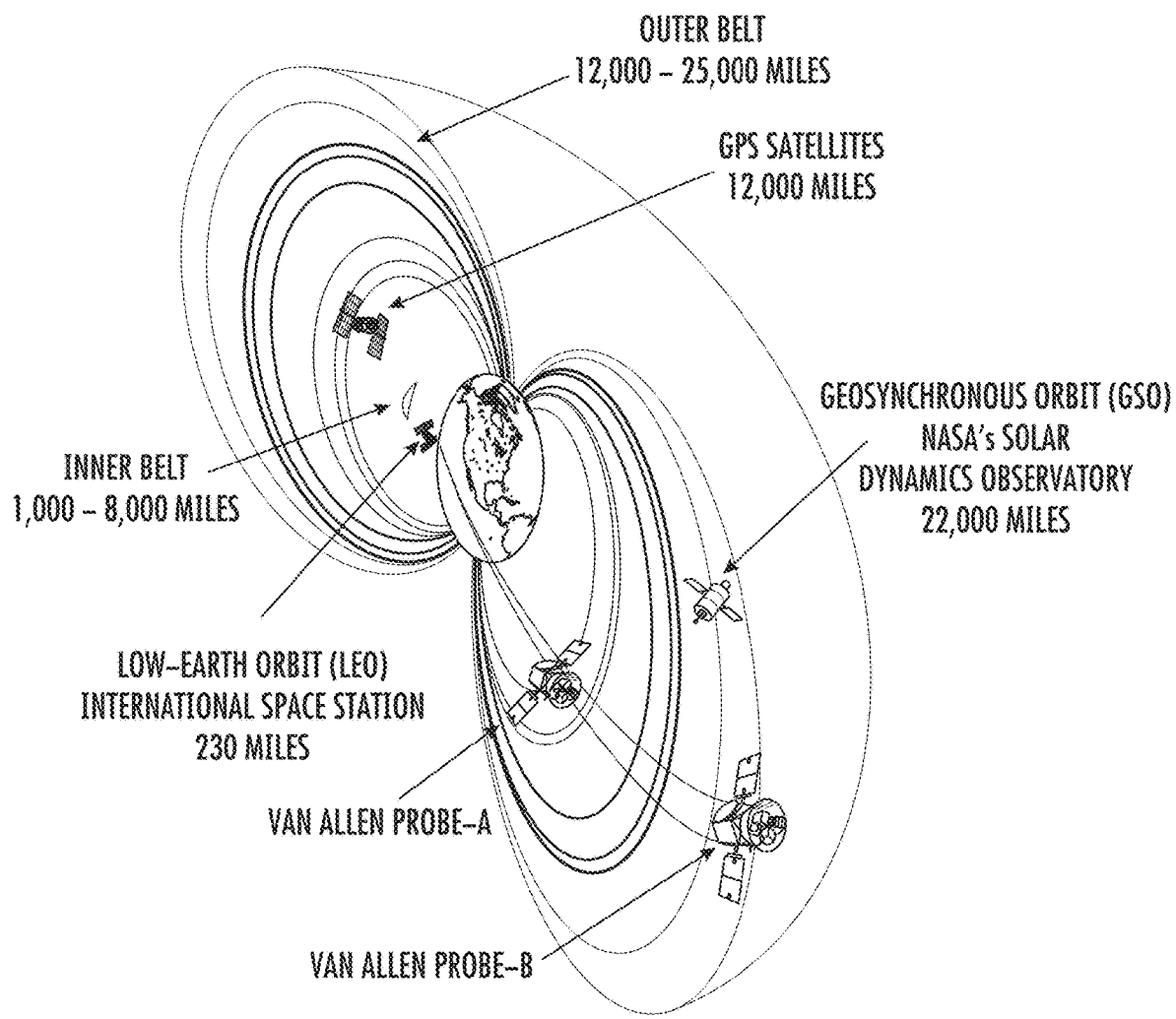
FIG. 6 illustrates the relative location of the LEO and GEO with respect to the Inner and Outer Van Allen Radiation belts.

A computer model of the near-Earth space environment together with the solar plasma, consisting of highly charged ions, electrons and gamma rays has been documented, studied and built with data from many science missions over the years. A graphic illustration of the near-Earth environment is shown in FIG. 6. Clearly showing the Van Allen radiation belts with respect to low Earth and geosynchronous orbits. Satellite missions such as: ACE, Hawkeye, Imp3 Imp8, Polar, SOHO and Wind have been launched to study the solar wind and the interaction with the Earths magnetosphere.

Figure 7:
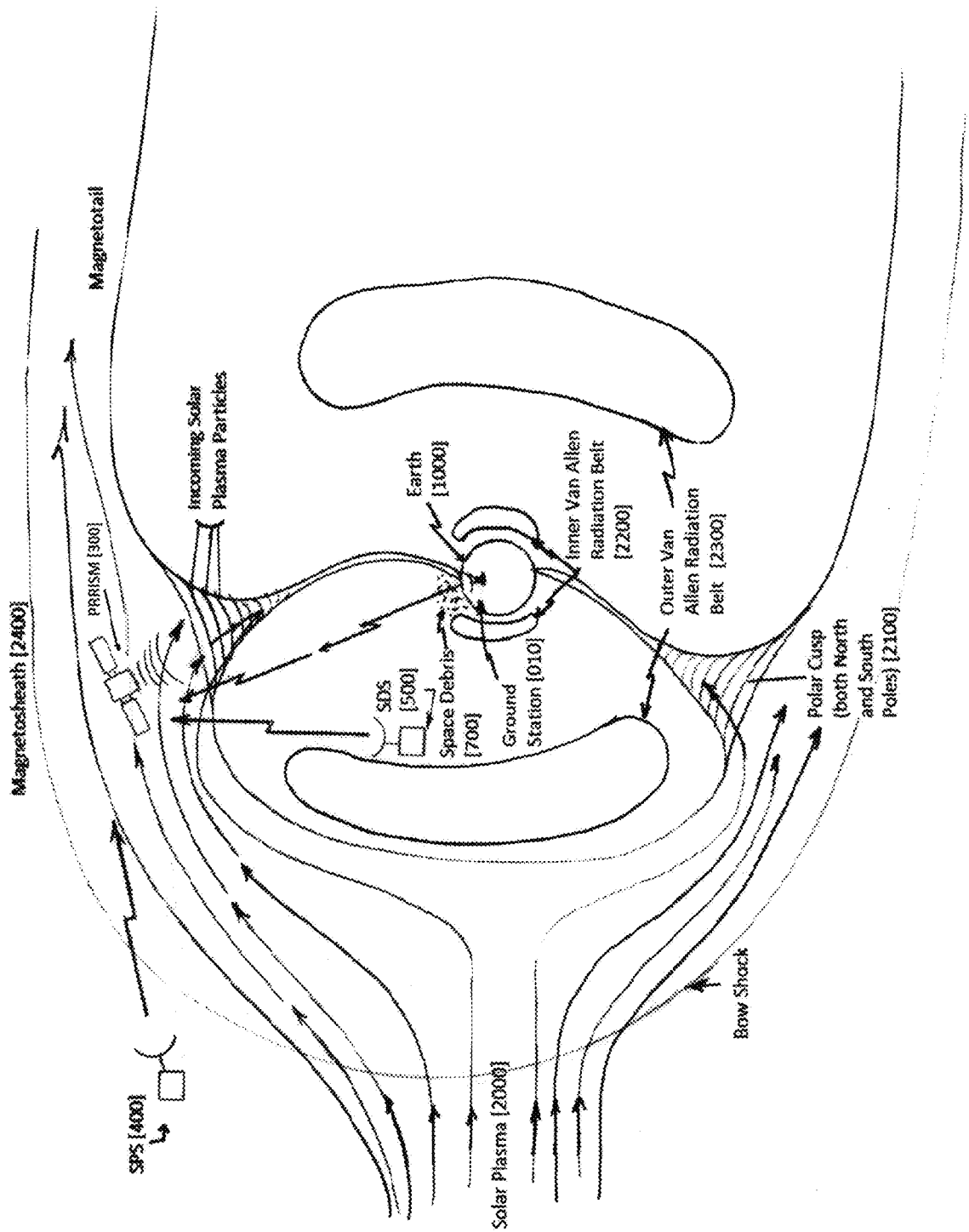
FIG. 7 illustrates the location of PRRISM at the northern Polar Cusp with the antenna focused at the entrance.

While the North and South poles offer a natural magnetic attraction for the solar wind and the highly charged particles within, the solar wind offers a readily available medium to help sweep away the small debris particles in Low Earth Orbit. As illustrated in FIG. 7, this embodiment would use an electromagnetic wave generated by an antenna 100 mounted on a dedicated PRRISM Satellite 300 and placed near the intercept at the Polar Cusps 2100, or at some other optimum location. The PRRISM satellite 300, would aim electromagnetic waves into the Polar Cusp 2100 to increase the density, redirect and streamline the particle flow within the cusp and increase the temperature so that a greater pressure force could be directed onto the space debris. The charged particles present in the high velocity flow of the solar wind are naturally redirected through the Polar Cusp with an antenna-focused electromagnetic wave. Using the electromagnetic wave, the naturally diverted solar wind flow could be strengthened by improving the laminar flow, reducing turbulence and increasing the density by heating the plasma through the Polar Cusp. This highly charged flow of solar wind 2000 could be harnessed and regulated to induce a discrete pressure wave burst of plasma at a specific time and duration (per a computer-generated target solution) when the debris cloud is passing below the Polar Cusps 2100 near the North or South pole.

Figure 8:
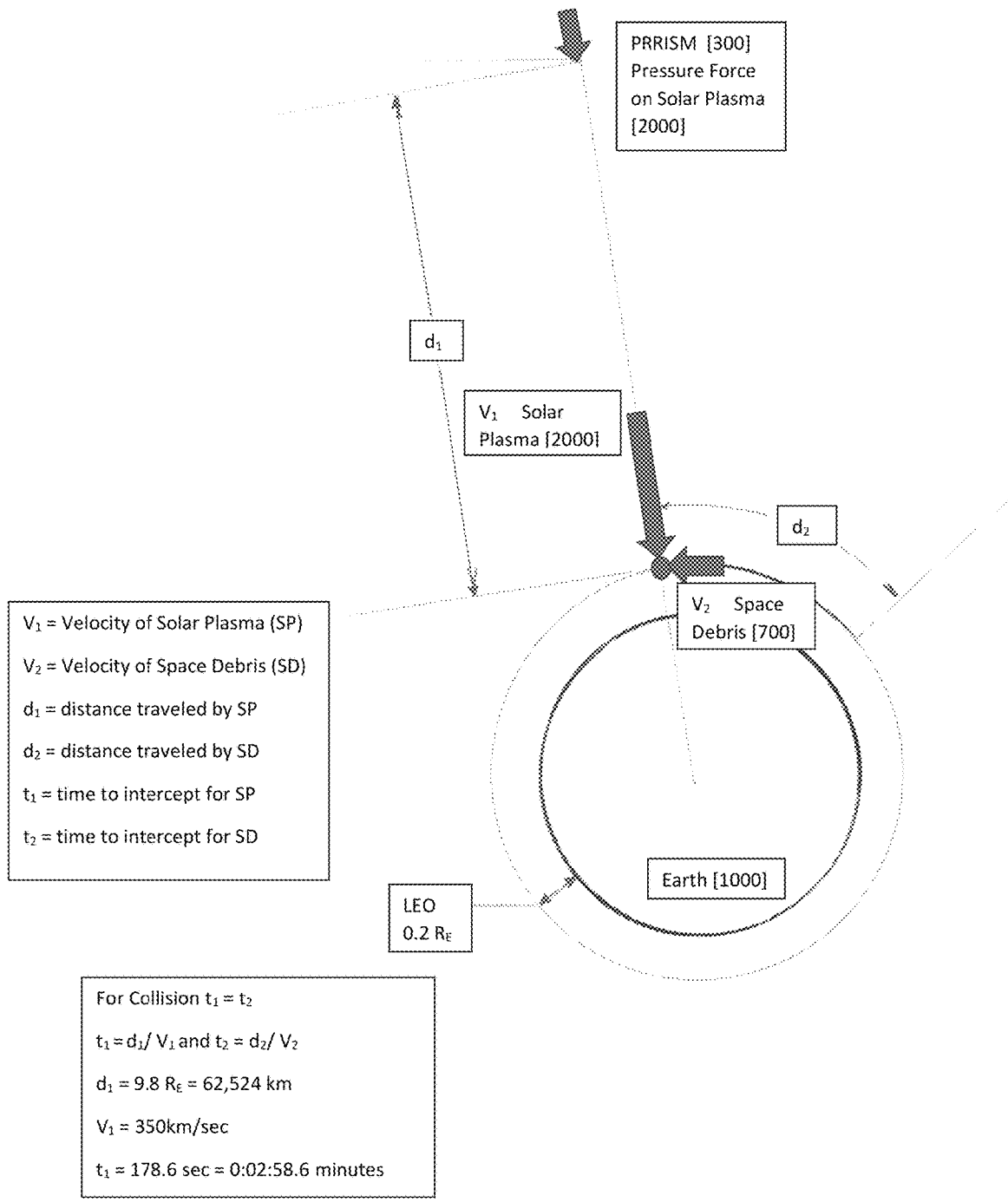
FIG. 8 illustrates a basic two-dimensional intercept calculation.

FIG. 8 illustrates the computation for a 2 degree-of-freedom intercept with the solar wind flow 2000 and the space debris 700 in either Low Earth or Geosynchronous Earth Orbit. A 3-D computation is more rigorous and could be readily accomplished using a computer program to develop the math using a "quartic formula" with up to four solutions. However, the 2-D computational approach is useful in giving an approximation of the closure time with a known distance to the debris. This will be discussed in more detail below.

The PRRISM satellite 300 would receive telemetry data from the Solar Plasma Sensor (SPS) 400, either on board or remotely located and from the Space Debris Sensor (SDS) 500, also on board or remotely located. For the Solar Plasma Sensor 400, a variety of sensors have been used on earlier space solar missions and can be modified as necessary to meet mission requirements. Several instruments like the Magnetospheric Ion Composition Spectrometer on CRRES and Polar; Electron and Proton Wide-Angle Spectrometer (EPAS) on CRRES; Charge, Element and Isotope Analysis System (CELIAS) on SOHO are a few. Currently space debris is tracked by the U.S. Air Force Joint Space Operations Center (JSpOC) but with limitations to debris sizes greater than 10 cm. One company, LeoLabs, a manufacturer of phased array radars, claims to detect space debris as small as 2 cm. This offers the opportunity of increased detection capability and the opportunity of outsourcing the SDS to a company such as LeoLabs. The Targeting Computer (TC) on board the PRRISM Satellite 300 would receive the telemetry data from the SPS 400 regarding the net polarity, electric field strength, magnetic field strength, frequency, velocity, and density of the solar plasma. The SDS 500 would send telemetry data to the TC with debris data such as density, size, velocity, and trajectory of the next large debris cloud passing beneath the Polar Cusps 2100. The TC would then determine the required orientation of the PRRISM antenna 300, the magnitude of the electric field strength, magnetic field strength, frequency and polarization of the electromagnetic wave, along with the timing and power-up sequencing of the PRRISM antenna 100. This electromagnetic wave antenna 100 would decrease turbulence and increase the laminar flow of the plasma through the Polar Cusp 2100 while increasing the temperature and proton density within the plasma. The TC would also provide intercept coordinates and duration for the electromagnetic directed pressure wave of solar plasma 2000 to intercept and move the debris cloud 700 into a decaying orbit. The result would be to redirect the debris 700 into the atmosphere to burn up along with other charged plasma creating the familiar light show known as the northern and southern lights. The timing and sequencing of the electromagnetic (EM) wave could be pulsed or varied depending on the pressure force required. Debris 700 targeting would be made in a prioritized manner and coordinated with the international space-faring community using a space debris priority system based on particle size, location, altitude, debris cloud density and inclination.

For maximum effectiveness, the PRRISM satellite location near the Polar Cusps 2100 would have to be evaluated based on the targeted debris size and location. Optimizing the EM wave pressure force of the solar wind 2000 in a quantity sufficient to deflect the small debris particles 700 orbiting at a particular altitude and inclination is required. The proper location would be dependent on the characteristics of the plasma stream, orbital mechanics of PRRISM 300 and efficiency of the EM wave antenna 100 to streamline the solar wind 2000 flow from turbulent to laminar through the Polar Cusp 2100 with the appropriate amount of pressure force for the targeted debris. Parameters for consideration would also include increasing the local proton density and temperature within the Polar Cusp 2100. Science data from Hawkeye and Imp-8 satellite missions studying the sun have shown that proton density within the Polar Cusp 2100 is unchanged from the free solar wind 2000 prior to the cusp until it is less than 4 $R_E$. At lower altitudes, the normal proton density increases to 100 to 200 per $cm^3$. Several possible locations in a range of heliosynchronous orbits from 5 to 10 $R_E$ would be needed. A necessary minimum pressure force of solar plasma 2000 would be necessary to cause a shift in the orbital velocity of the debris 700 particles to cause them to deorbit. However, a small pressure force of solar wind 2000 injected with just enough force could serve to make the necessary change in the debris velocity vector. This would then lower its orbiting altitude until it receives enough additional drag from the atmosphere to burn up and deorbit. A stream of solar wind diverted to a target debris field would be dependent on the characteristics of the plasma and the distance from the targeted debris. A necessary minimum pressure force of solar wind would be based on the density of the plasma stream at the time of targeting. An estimated calculation of the minimum force required to remove a small piece of debris from a 500 Km orbit is provided below. The PRRISM antenna 100 operation would be initiated via telemetry from a ground station 010 with the capability to adjust the electromagnetic wave strength. The SDS 500 unit either on board or remotely located, would send a telemetry signal to indicate the location, velocity and other defining parameters of the approaching debris to then trigger the on board PRRISM Targeting computer to create an intercept solution, establish the appropriate EM wave strength and timing for a time and location in space that would intersect with a large debris cloud selected for removal.

Figure 9:
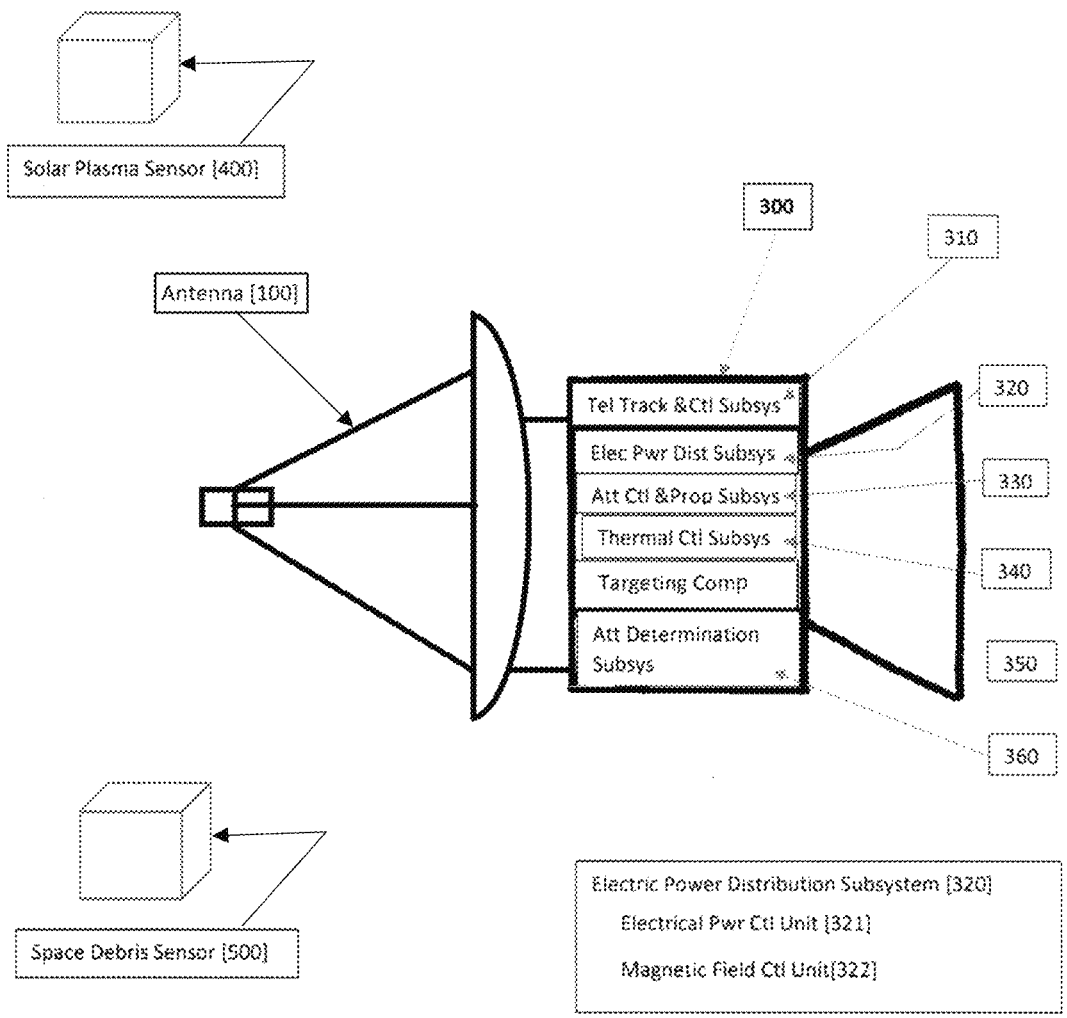
FIG. 9 illustrates a two-dimensional view of a PRRISM satellite.
Figure 10:
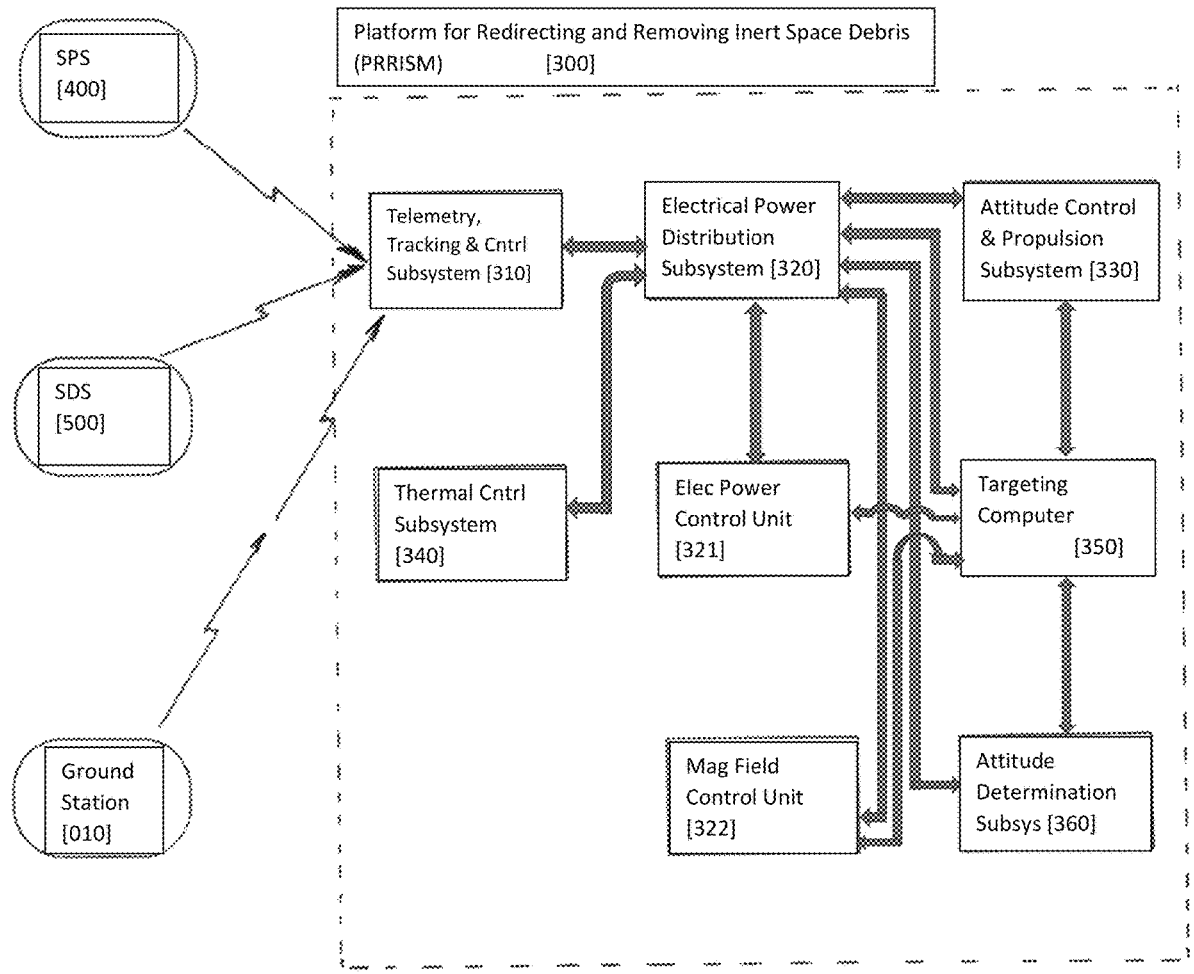
FIG. 10 illustrates a system level block diagram of the subsystems within a PRRISM satellite.

The embodiment of PRRISM would be the construction of a satellite having an EM wave antenna 100 installed as shown in FIG. 9. PRRISM 300 would be maneuvered with small thrusters to aim the antenna 100 at the Polar Cusp 2100; to emit an EM wave burst; and create a pressure wave of plasma 2000 in the proper direction that would eliminate turbulence, create laminar flow and force the targeted space debris 700 towards a lower and unsustainable orbit. This would allow PRRISM 300 to redirect the solar wind 2000 while positioned at an optimum location in space near the Polar Cusps 2100 and outside of the targeted orbit. The PRRISM subsystems are shown in FIG. 10 and will be discussed later.

This design could take on several configurations. In the first scenario, as described above, the PRRISM satellite 300 with a front mounted antenna 100 produces an electromagnetic wave and is positioned near the Polar Cusps 2100 to streamline the solar wind 2000 through the Polar Cusp 2100 for a predetermined time and duration to intercept with the space debris 700 passing at a lower altitude causing the debris to be deflected downward at or near the poles into a decaying orbit.

Figure 11:
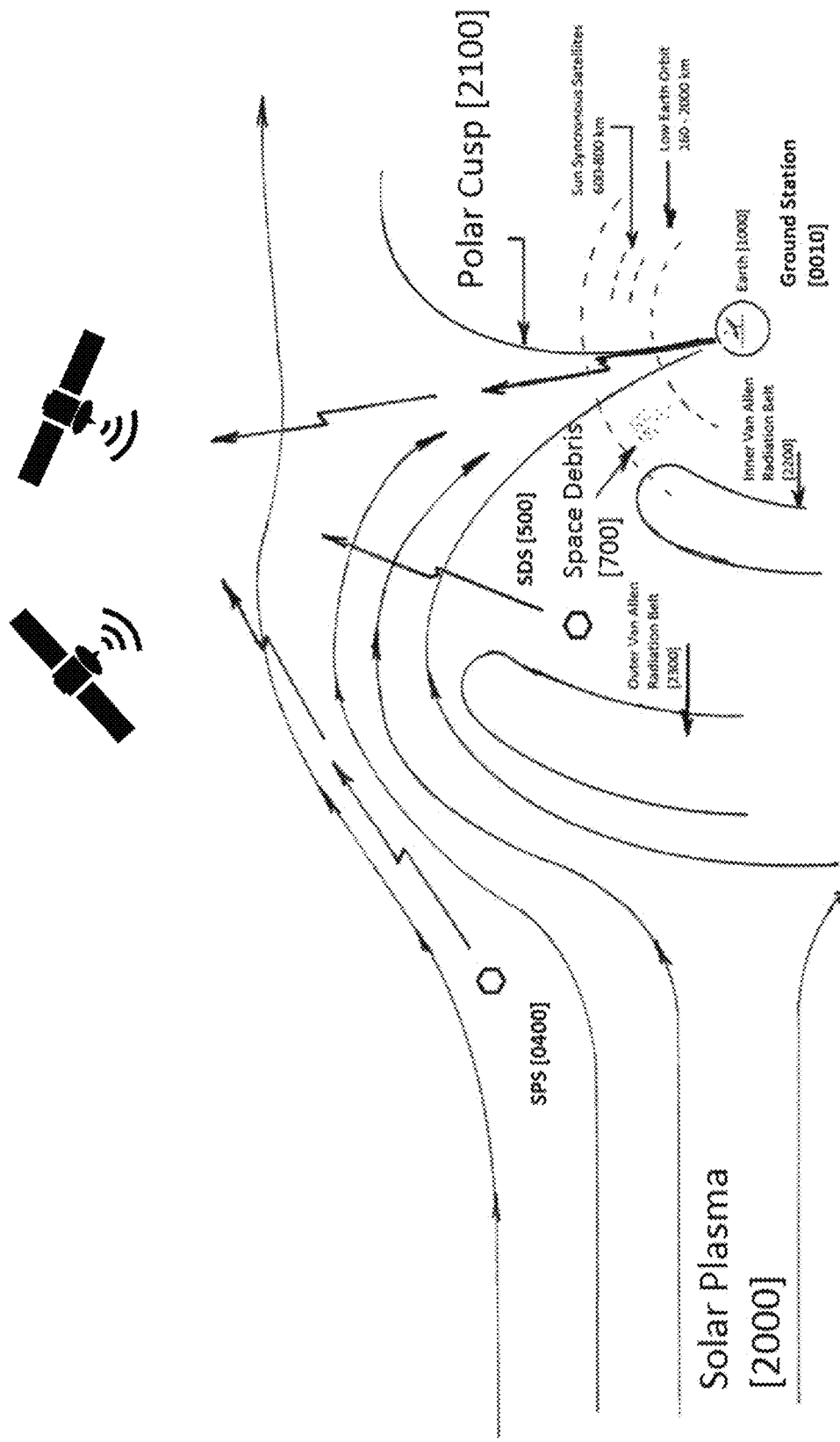
FIG. 11 illustrates a multiple satellite system with two PRRISM satellites operating together.

A further modification of this design, illustrated in FIG. 11, could utilize multiple Satellites to generate a much larger and more powerful electromagnetic wave to redirect more of the solar wind particles and eliminate the turbulence. This would allow a pressure force sufficient to create a laminar flow of plasma 2000 through the Polar Cusps 2100 to then redirect and de-orbit space debris 700 orbiting below the Polar Cusps 2100 and near the North and South poles. Science data from earlier space science missions such as ACE, Hawkeye, Imp-3, Imp-8, Polar, SOHO and Wind (all taken at different distances from Earth) would be reviewed and the flow volume, plasma electrical charge, rate of change of electrical charge, plasma velocity, plasma density and distance from the debris would be determined based on the particle size, velocity, distance, type of debris and quantity of the debris field being targeted. An optimum location or locations would be determined by several factors such as: the velocity of the solar plasma 2000, the time to intercept the debris field 700 and the altitude and inclination of the debris field. Given the various inclinations and orbits of the debris 700, it may be advantageous in one case to have PRRISM 300 at 10 $R_E$ and at a different distance for another debris field 700.

Figure 12:
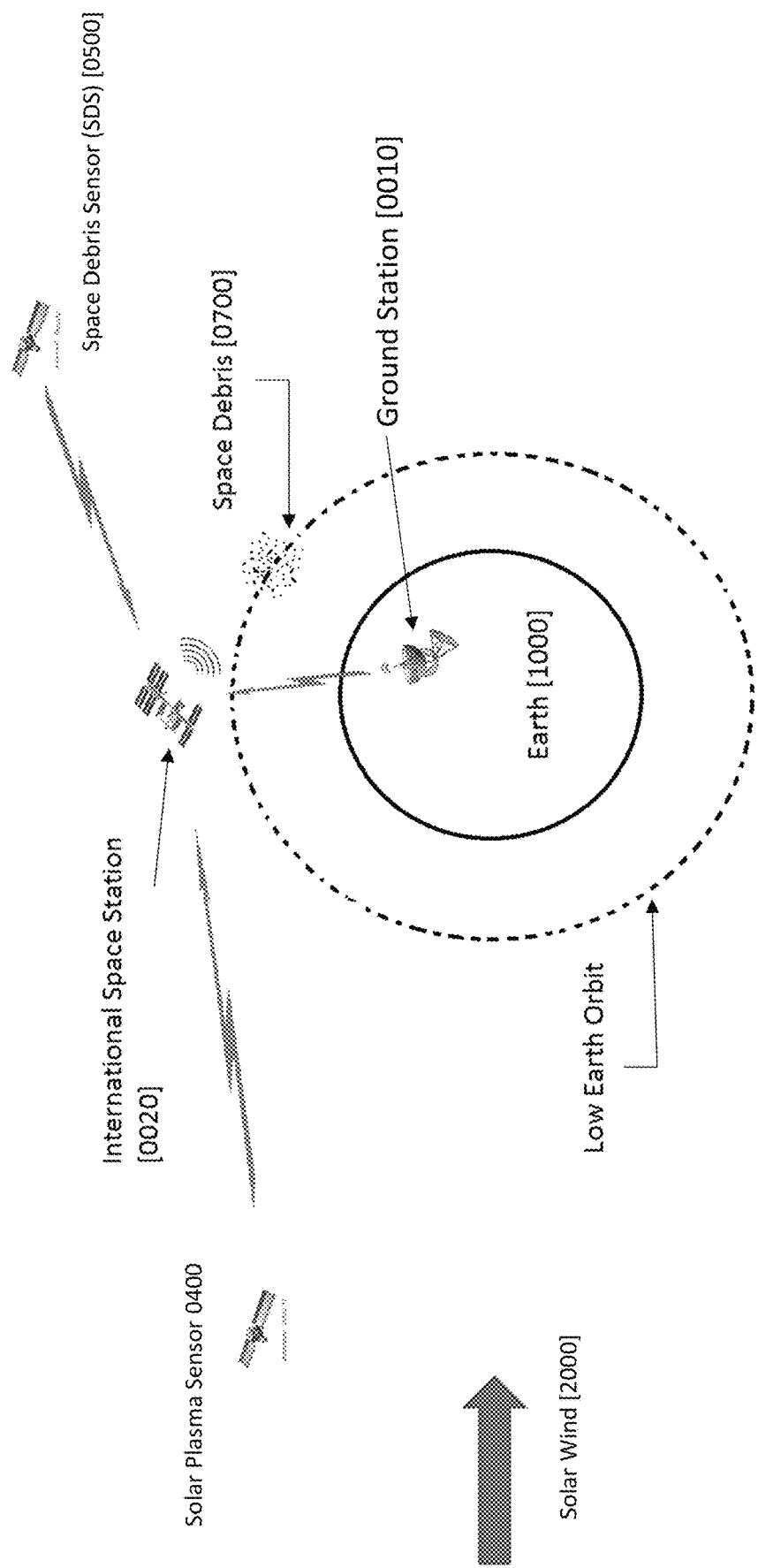
FIG. 12 illustrates a two-dimensional view of PRRISM operating from the International Space Station to target the orbital debris cloud.

Another version is illustrated in FIG. 12 where the debris removal operation could take place within LEO or GEO. In this scenario, only the PRRISM 300 antenna would be mounted externally on the International Space Station (ISS) 020 and operated by an astronaut on the ISS 020 to target the orbital debris cloud 700. The interaction of the EM wave and the space debris 700 would result in a downward trajectory for the debris. The onboard or remote SDS 500 would provide position data to locate the space debris with respect to the ISS 020. This embodiment would interact with the space debris 700 directly and thereby deflect the space debris to a lower and eventual decaying orbit.

FIG. 1 illustrates the distances between various scientific features or locations in the near and distant Earth environment. Using a scale in Mean Earth Radius ($R_E$), various locations can be shown in relation to one another. The Mean Earth Radius is defined as 6380 km or 3959 miles. Specifically, the Low Earth Orbit at 0.03 to 0.3 $R_E$ and Geosynchronous Earth Orbit at 5.6 $R_E$ are shown in relation to the Inner Van Allen Radiation belt ranging from 0.2 to 2.0 $R_E$ and the Outer Van Allen Radiation belt extending from 3 to 10 $R_E$. Also, the North and South Polar Cusps are located from 5 to 10 $R_E$. This distance will vary depending on the solar activity such as Coronal Mass Ejections (CME) at the time. The distant Lagrange Point (L1) in terms of Mean Earth Radius ($R_E$) is significantly further away at 256 $R_E$.

Figure 2:
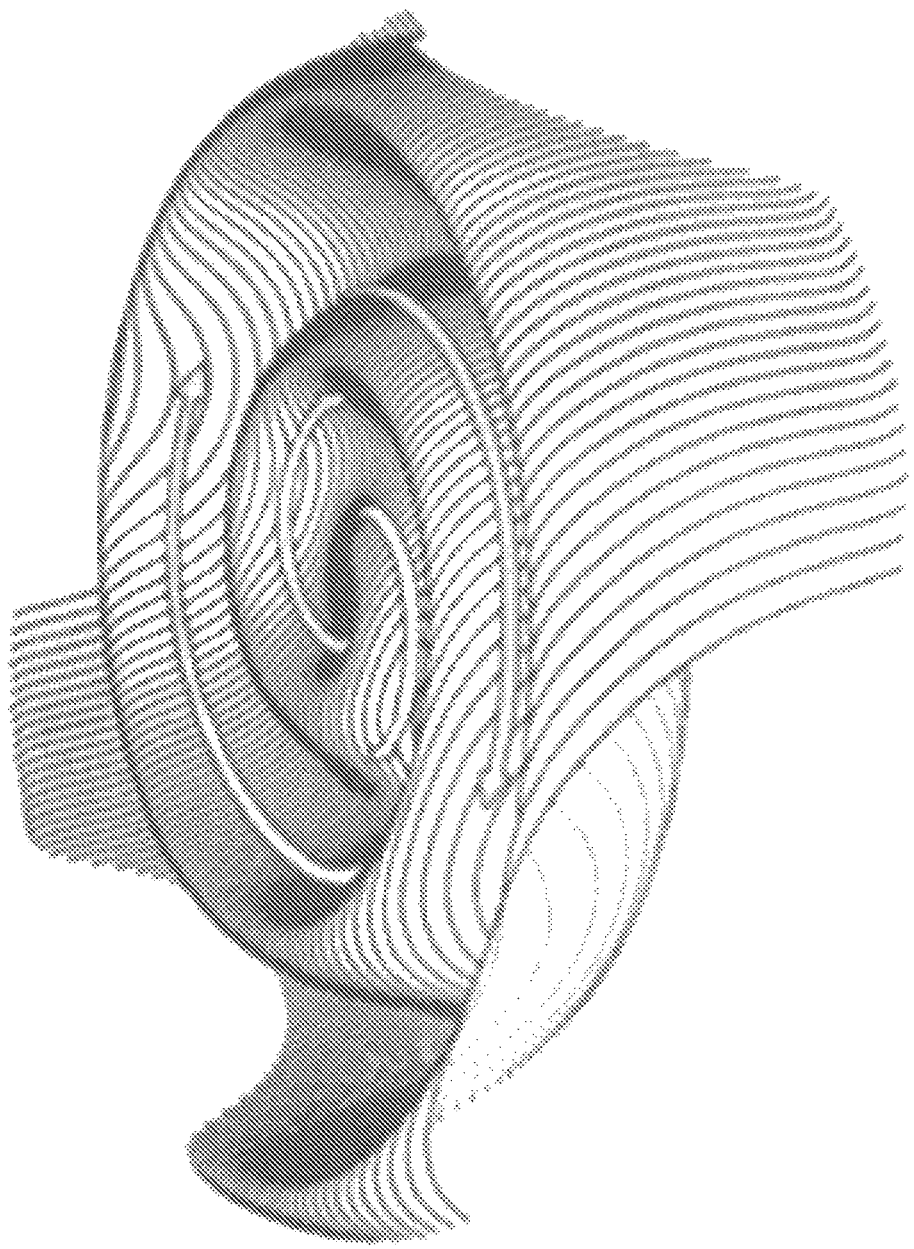
FIG. 2 is an illustration of the Parker Spiral.

FIG. 2 illustrates the Parker Spiral, a term that is commonly used to describe the solar wind flow as it moves outward from the Sun in a toroidal wave with its oscillating change in flow direction (up/down or North/South) as it passes the inner planets and eventually approaches Earth.

Figure 3:
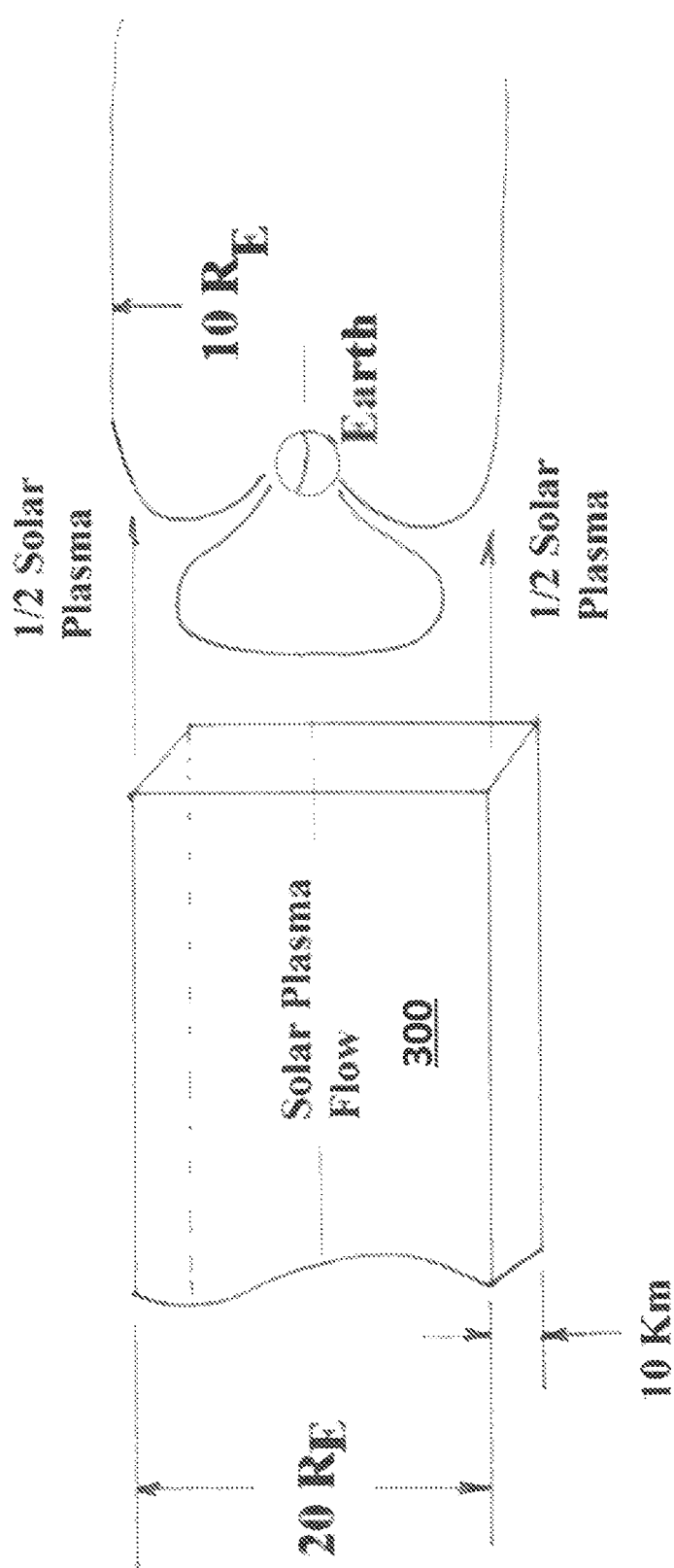
FIG. 3 is a graphical representation of the solar wind free stream flow prior to the Polar Cusp.

FIG. 3 is an estimated graphical representation of the cross-sectional area 300 of the free stream solar wind. As previously shown it was necessary to demonstrate that there is a significant amount of mass flow from the solar wind to accomplish space debris removal without any collateral damage to satellites in the vicinity of the target area. This cross-sectional area was estimated based on the approximate location of PRRISM at the northern Polar Cusp. Having gone through the calculations earlier, the resulting solar wind force of 2360 Newtons is more than adequate for the task.

FIG. 4 illustrates the exterior and interior areas of the Polar Cusp with respect to the magnetosheath and the magnetopause. The Earth's rotation is counterclockwise so that the dawn to dusk flow would be out of the paper and the dusk to dawn flow would be into the paper. In the vicinity of the exterior of the Polar Cusp, the solar wind, flowing with both the charged particles of the solar plasma and the interplanetary magnetic field (IMF), interact with the Earth's geomagnetic field and begin a complex reconnection process with significant turbulence. The flux-tube reconnection process is largely dependent on the IMF orientation (southward or northward). Within the exterior of the cusp, the solar plasma mean flow is recorded as 300 km/s Dawnward. Whereas, on the magnetosheath side, the solar wind flow is 200 km/s northward and slightly Duskward. Further into the Interior of the cusp, the solar plasma is 250 to 300 km/s from dusk to dawn and the geomagnetic field is weak with no clear direction. It is within the interior of the cusp that ionospheric influences appear higher up in the Polar Cusp and proton density increases at altitudes below 4 $R_E$. The presence of ionospheric ions higher in the Polar Cusp with some vertical flow again indicates the presence of a turbulent region within the Polar Cusp.

FIG. 5 illustrates a graphical representation of the exit area of the Polar Cusp based on science data reported by Maynard. He states that in the Ionosphere, the cusp is several hours wide and several degrees in depth. Based on this information, we use a small area created by 2° of North latitude from 79° to 81° with the width of 2 hours on the circumference at 80° north latitude. The exit area was calculated to determine the normal mass flow through the Polar Cusp and the resulting pressure force that would be available to remove space debris in lower Earth orbits. The calculated pressure force is 32.4 Newtons and will be compared with the significantly smaller force necessary for the space debris to remain in orbit or removed from orbit.

FIG. 6 illustrates another view of the relative location of the LEO and GEO with respect to the Inner 2200 and Outer 2300 Van Allen Radiation belts. These belts shield the Earth from the solar radiation but also create part of the boundary for the Polar Cusps 2100 and make it possible for a small portion of the solar wind to enter the Earth's 1000 atmosphere.

FIG. 7 illustrates the PRRISM Satellite 300 stationed at a predetermined location in space near the northern Polar Cusp 2100 to interact with the solar wind, where solar wind particles enter into the Earth's 1000 atmosphere at the North and South poles via the Polar Cusps 2100 resulting in the northern and southern lights. The exterior or entrance to the Polar Cusps 2100 are located in a region inside of the magnetopause on the dayside, where the magnetic field lines split at about 80° magnetic latitude. It is through the cusps that the solar wind has access to the Earth's magnetosphere. The entry point to the Polar Cusps 2100 varies from 5 to 10 $R_E$. The PRRISM Satellite would be positioned at approximately 10 $R_E$. The exact position or positions would be determined based on solar plasma proton density, space debris orbit, space debris inclination and other parameters. To a large extent, the Van Allen radiation belts 2200 and 2300 act as a protective shield to most of the solar plasma reaching the Earth 1000 forming the magnetosheath and a trailing magnetotail downstream of the Earth.

Conceptually, a single PRRISM Satellite at a predetermined location, based on test, near either or both of the Polar Cusps 2100, would be positioned with an antenna generating an electromagnetic wave to streamline a larger quantity of solar plasma through the Polar Cusps 2100. This is necessary because science data indicates that within both the exterior and interior portions of the Polar Cusp there exists a significant amount of turbulence which restricts the downward flow of the solar wind. An EM wave would accomplish several objectives: (a) It would reduce the turbulence creating a more laminar flow through the Polar Cusp 2100, (b) It would increase the density and temperature of the charge particles within the solar plasma resulting in a greater pressure force to act on the space debris. This EM wave would operate with a polarization based on the net polarity of the solar plasma recorded by the solar plasma sensor (SPS), instruments either on board or remotely located.

Previous solar science missions were placed in many different orbits with slightly different objectives but using a variety of science instruments with some overlap in objectives and methodology. The WIND Satellite operated in a halo orbit about the L1 Lagrange point at 256 $R_E$, the Hawkeye Satellite was in an elliptical orbit with an apogee of 21$R_E$, passing through the northern cusp at 5 to 10 $R_E$, and the Polar Satellite was in an elliptical polar orbit of 9.5 $R_E \times 1.8$ $R_E$. CRRES was placed in an elliptical orbit of 350×33,584 km with an inclination of 18.1° (0.2$R_E$ to 5.5$R_E$). A variety of instruments has previously been used and can be adapted to meet the requirements of this mission with some modifications. The WIND Faraday Cup instruments measured the number density, thermal, speed and bulk flow velocity of the protons and alpha particles; the WIND Electron Spectrometer Instrument, performed 3-D measurements of the electron density, bulk velocity, pressure tensor, and thermal flux vector. The Polar Satellite, used a Hot Plasma Analyzer (HYDRA) to measure bulk flow and the Electric Field Instrument (EFI) to measure the electron density. The CRRES Magnetospheric Ion Composition Spectrometer (MICS) provided for characterization of incident ions by determining their mass, charge, and velocity. These or similar instruments would be used in the Solar Plasma Sensor 0400 to monitor and record the solar plasma flow for an intercept with targeted space debris. Key parameters of the solar plasma are plasma net polarity, plasma electrical charge, plasma magnetic field strength, electron density, ion density, proton density, flux density and plasma flow velocity. Another sensor, the Space Debris Sensor (SDS) [0500] would be located outside of Low Earth Orbit, on the International Space Station or on the ground to detect the size of the debris particles (2 cm and larger), the extent of the debris field, debris flux density, debris altitude, debris velocity, debris inclination and distance of debris from PRRISM [0300]. Both the SPS and the SDS would send telemetry data to PRRISM for the onboard TC to calculate an intercept location for the solar plasma and the space debris. A ground-based space debris detection system is currently being developed by the LeoLabs company.

FIG. 8 illustrates a 2-D computation for an intercept with the solar wind flow and the space debris in either Low Earth or Geosynchronous Earth Orbit is rigorous and would be more readily accomplished using a computer program to develop the solutions using a "quartic formula" with up to four solutions. This figure shows a basic two-dimensional intercept with an estimated location at 10 $R_E$ for the PRRISM and the target space debris in a Low Earth orbit at 0.2 $R_E$. Assuming constant velocity, an estimate of the time to intercept can be determined by using the formula:

$$t = d/V,$$

where: t is the time to intercept
d is the distance traveled
v is the velocity

For the intercept to occur, the time $t_1$ for the diverted plasma flow must equal the time $t_2$ for the space debris.
This results in the formula:

$$d_1/V_1 = d_2/v_2.$$

Using $d_1 = 9.8$ $R_E$
$v_1 = 350$ km/s for the solar plasma and
$t_1 = t_2$ With $R_E = 6380$ km and solving for $t_1$ Yields $t_1 = 178.6$ sec This is just under 3 minutes to the intercept location and contact with the debris. At this point the debris would be pushed to a lower and decaying orbit by using the higher-pressure force of the diverted and more laminar solar plasma flow. Variations of this diverted solar plasma flow would be to use a larger EM wave or multiple PRRISM satellites. This will be discussed in more detail in later paragraphs. The process would be repeated as each debris cloud passes into the target area and the plasma flow would be redirected with a sufficient mass flow to intercept and push the debris into a deteriorating orbit to burn up harmlessly in the Earth's atmosphere.

FIG. 9. Shows the PRRISM Satellite 300 with some principal subsystems. Attached to the Satellite is the electromagnetic (EM) wave antenna 100. This antenna would generate a sufficient EM wave creating a pressure force sufficient to redirect and accelerate the solar wind through the Polar Cusp 2100. Science data has shown that the density of the solar plasma within the Polar Cusp is unchanged until deeper into the Polar Cusp where at altitudes less than 4 $R_E$ the density increases. Calculations of the normal pressure force through the cusps and the necessary pressure force (which is magnitudes less) to remove small debris from low Earth orbit is provided below.

Many of the Solar Plasma Sensor instruments referenced in this patent have been tested on previous scientific satellites such as ACE, CRRES, IMP-3, IMP-8, Polar, and WIND. The Space Debris Sensor [0500] would use an improved version of the JSpOC tracking radar or one similar to a design developed by LeoLabs. The primary PRRISM satellite systems are the following: The Satellite Telemetry, Tracking & Control Subsystem (TTCS) 310 provides the capability to command and operate the Satellite and to record and transmit science and engineering telemetry data.

This unit is capable of executing commands in real time or storing them for delayed execution. The Satellite Electrical Power Distribution Subsystem (EPDS) 320 provides for the generation, storage, distribution, and control of power required for operating the Satellite and instruments. While sunlit, power is normally supplied by the solar arrays. The Batteries supply power while in the Earth's shadow, or during specific functions requiring the PRRISM to be pointed away from the sun. The Satellite Attitude Control & Propulsion Subsystem (ACPS) 330 contains the hydrazine thrusters to precess the satellite spin axis and control its spin rate. Small orbital maneuvers are also made by these thrusters. The ACPS 330 would orient the PRRISM antenna to focus the EM wave at the entrance of the Polar Cusp 2100 to redirect the solar wind for the duration of the targeting sequence. The Satellite Thermal Control Subsystem (TCS) 340] provides an acceptable thermal environment for the Satellite subsystems and instruments primarily by using passive thermal control with thermal finishes and blanketing. The Satellite Attitude Determination Subsystem (ADS) 360 is used to determine the Satellite attitude and spin rate. This allows subsystems to keep within nominal environments, and provide a reference frame for the mission. The ADS 360 is designed to provide knowledge of the Satellite spin axis in inertial space. The PRRISM satellite 300 would not be adding any propulsive force to the solar plasma. However, during an actual targeting sequence, the EM wave would increase the laminar flow and increase proton density to increase the pressure force of the solar plasma on the targeted space debris. The Satellite Attitude Determination Subsystem 360 would orient the PRRISM to concentrate the EM wave on the solar plasma and maintain the proper frame of reference for the duration of the targeting sequence. Specific to the PRRISM satellite system 300 are the Targeting Computer (TC) 350, The Antenna EM wave Electrical Power Control Unit 321 and the Magnetic field control unit 322. These subsystems would interact with each other using telemetry data from the Solar Plasma Sensor 400; the Space Debris Sensor 500; and the Ground Station 10 to position the PRRISM antenna 100 for a predetermined period of time. This would provide the PRRISM antenna 100 with sufficient power to produce an electromagnetic wave to redirect the solar plasma into the Northern or Southern Polar Cusp 2100 with an increase in laminar flow and pressure force.

Housekeeping functions would occur at scheduled intervals throughout the mission. The PRRISM TTCS 310, operating in a polar orbit, would receive a data stream transmission from the SDS 500 indicating debris particle size, debris flux density, debris altitude, debris velocity, debris inclination and distance of the debris cloud from the PRRISM satellite 300. A ground command would trigger a chain of events to intercept the debris based on predetermined lead distance of the selected target debris from the intercept location (as with a missile intercept scenario). Data received from the SPS 400 would include electric field strength, magnetic field strength, frequency, density, thermal flux, velocity and mass flow of the protons and alpha particles (similar to the WIND Faraday Cup instrument) together with measurements of the electron density, velocity, pressure tensor, thermal flux (similar to the WIND Electron Spectrometer Instrument), and ion mass, charge and velocity using a Magnetospheric Ion Composition Spectrometer instrument (Similar to the instrument used on CRRES). The intercept sequence would begin with a command from ground control 10 for the Targeting Computer 350 to access the Solar Plasma Sensor 400 data. The Targeting Computer 350 would then determine (1) a time and distance to the intercept location (2) the orientation in space of the PRRISM antenna 100 to aim the EM wave in order to redirect a non-turbulent and denser stream of solar plasma towards and through the Polar Cusps in a laminar flow (3) the duration of targeting sequence and (4) the electric field strength, magnetic field strength, polarity and frequency for the EM wave antenna.

FIG. 10 illustrates a control system level block diagram with connectivity between the PRRISM Satellite 300 subsystems, the on-board or remote Solar Plasma Sensor (SPS) 400, the onboard or remote Space Debris Sensor (SDS) 500 and the Ground Station 10. The SPS 400 would send telemetry data and necessary solar plasma parameters to the PRRISM Satellite 300 Telemetry Tracking and Control Subsystem 310, then to the PRRISM Targeting Computer 350. Similarly, the SDS 500 would send telemetry data with information on space debris to the PRRISM Telemetry Tracking and Control Subsystem 310 and then to the PRRISM TC 350. The PRRISM TC 350 would then determine intercept coordinates, provide control data to the PRRISM Electrical Power Distribution Subsystem 320, guidance data to the Satellite Attitude Control and Propulsion Subsystem 330, and adjust electrical power, polarity and field strength of the PRRISM Electric Power Control Unit 321 and the PRRISM Magnetic Field Control Unit 322 via the Electrical Power Distribution Subsystem 320. The Attitude Determination Subsystem 360 would provide continual position and tracking coordinates to the PRRISM TC 350. The Satellite EPDS 320 would also control Satellite power requirements, battery, and solar panel conditioning.

FIG. 11 illustrates the use of an alternate approach by using a constellation of two or more satellites, each with an antenna generating an EM wave and aimed at the Polar Cusp or Cusps 2100, to harness a greater amount of solar plasma 2000 through the northern Polar Cusp 2100. As in the single satellite operation, the electromagnetic (EM) wave would reduce the turbulence in the Polar Cusp by matching the electric and magnetic fields, frequency and polarity of the solar wind in the polar cusp and creating a more laminar flow and in the process allowing for a greater mass flow through the Polar Cusp. The EM wave would be pulsed to create enough of a pressure force on the space debris 700 to impart a deorbiting velocity vector on the space debris cloud and slow or redirect the debris into a decaying orbit. The duration of the antenna 100 activation and electrical potential of both polarization and magnitude could be varied.

FIG. 12 illustrates another alternate use of a PRRISM antenna 100 mounted on the International Space Station 20 and operating within the LEO orbital region. In this scenario, the PRRISM antenna 100 would be aimed directly at the space debris. An EM wave pulse would be aimed at the debris 700 with enough pressure force to cause the debris 700 to either slow the orbital speed and/or redirect the debris 700 to a lower and decaying orbit. The PRRISM antenna 100 mounted on the International Space Station 20 would then be controlled and maneuvered by an astronaut at the International Space Station (ISS) 20 by direct line of sight or using video cams. The operator would aim the antenna 100 to intercept and redirect the Space Debris 700 to a decaying orbit. This maneuver could be practiced in a simulator on the ground and manually operated in space by astronauts using video cams. This concept of using the ISS 20 as a command station could also be used to address debris 700 in Geosynchronous Earth Orbit.

PRRISM 300 would be a standard Satellite with the usual subsystems for telemetry, tracking, command, thermal, propulsion and guidance as illustrated in FIG. 9. The CRRES satellite design or another science Satellite could be examples for this Satellite. The main difference would be the addition of the EM wave antenna 100 and the PRRISM targeting computer 350. The system would have an onboard or remote instrument capable of detecting debris 700 size and quantity and identifying the location, direction and range to the debris cloud 700. The USAF JSpOC monitors and catalogs space debris larger than 10 cm in diameter. Recently, LeoLabs has introduced a new approach with phased array radars in Texas and Alaska and claim to accurately detect space debris as small as 2 cm in diameter. Examples of the instruments were provided earlier for the Solar Plasma Sensor 400 and would use instruments previously operated on space science missions such as WIND, Polar, Hawkeye, and CRRES. The Space Debris Sensor 500 would utilize new technology similar to that being developed by LeoLabs.

Several calculations were made to determine the force required to cause a piece of space debris 700 in a 500 km orbit to de-orbit. First, the mass of a small piece of space debris is calculated. D. Kessler et al., in NASA Technical Memorandum 100471, determined that the average mass density ($\rho$) for debris objects 1 cm in diameter and smaller is 2.8 g/cm$^3$. For debris larger than 1 cm, the formula for the debris mass density is:

$$\rho = 2.8\ d^{-0.74}$$

where d is the debris diameter. For a diameter of 2 cm, which is the smallest detectable size, the mass density is:

$$\rho = 2.8 * (2)^{-0.74}$$
$$= 1.68\ \text{g/cm}^3$$

The mass of a 2-cm piece of space debris:

$$M = \rho * 4/3 * \Pi * r^3$$

M=7 g

The force necessary to keep a small mass of space debris in a 500-km orbit is shown by this relationship:

$$\text{Force}_{Space\ Debris} = G(M_E * m_{SD})/r_{SD}^2$$

where: G=Gravitational constant=$6.67 \times 10^{-11}$ N-m$^2$/kg$^2$
$M_E$=Mass of Earth=$5.98 \times 10^{24}$ kg
$m_{SD}$=mass of space debris=$7 \times 10^{-3}$ kg
$r_{SD}$=radial distance to the debris orbit=6380 km+500 km=6880 km $$\text{Force}_{Space\ Debris} = 6.67 \times 10^{-11}\ \text{N-m}^2/\text{kg}^2 * (5.98 \times 10^{24}\ \text{kg} * 7 \times 10^{-3}\ \text{kg})/(6.88 \times 10^6\ \text{m})^2$$

Force$_{Space\ Debris}$=0.059 Newtons
Force to remove 2 cm debris=>0.059 Newtons Therefore, it can be stated that a force greater than 0.059 Newtons would remove a piece of Space debris [700] 2 cm in diameter from a 500-km orbit. Looking at an orbit of 1000 km, the force is slightly less at 0.051 Newtons. A mass that represents a 2-cm diameter piece of debris was used based on Dr. Kessler's equation which was developed from numerous catalogued debris of different sizes and materials. From Kessler's equation it can be seen that the smaller the debris diameter, the larger the density and the larger the debris diameter, the greater the surface area and the lower the density. As can be seen from earlier calculations and summarized in the table FIG. 13 the estimated pressure force of the normal solar wind flow of 32.4 Newtons through the Polar Cusp would be sufficient, if unimpeded, to remove this and other small pieces of debris. However, space science data has shown that the turbulence in the Polar Cusp [2100] reduces the downward flow of the solar plasma in such a way that this pressure force is never achieved. By creating a laminar flow in the Polar Cusp [2100], a pressure force closer to 32.4 Newtons can be obtained.

FIG. 13 is a table summarizing all of the foregoing calculations.

Figure 14:
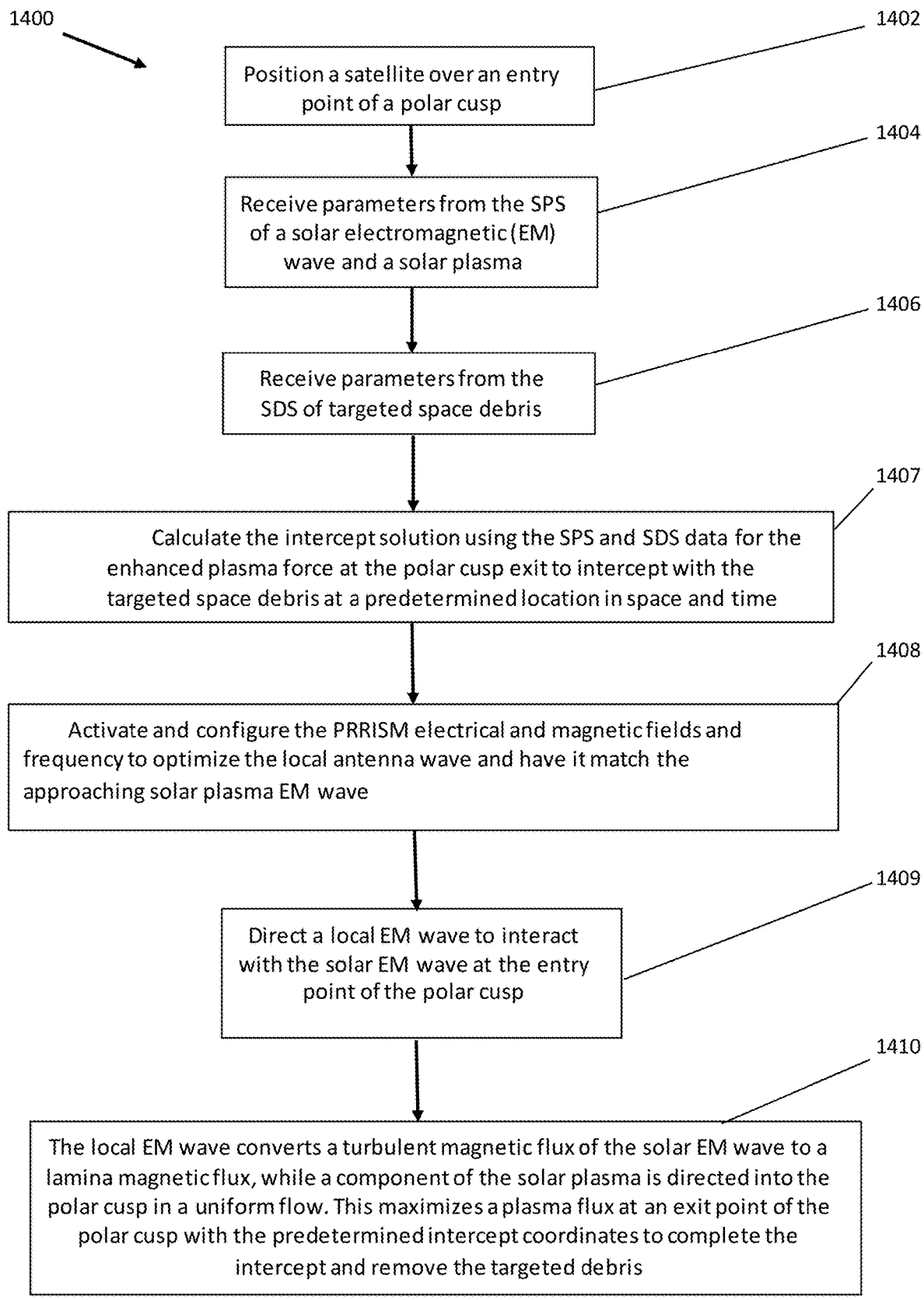
FIG. 14 is a flowchart illustrating an example method according to the present disclosure.

FIG. 14 is a flowchart 1400 illustrating a method for removing space debris according to one embodiment. The method begins at operation 1402, where a satellite, such as the PRRISM satellite 300 is positioned over an entry point of a polar cusp, such as the North or South polar cusps 2100, as illustrated in FIG. 7. At operation 1402, the satellite 300 receives parameters of a solar EM wave and a solar plasma from a solar plasma sensor (SPS), such as solar plasma sensor 400 in FIG. 9. At operation 1406, the satellite receives parameters of targeted space debris from space debris sensor (SDS), such as space debris sensor 500 in FIG. 9. At operation 1407, the targeting computer 350 calculates the intercept solution using the SPS and SDS data for the enhanced plasma force at the polar cusp exit to intercept with the targeted space debris. At operation 1408, the PRRISM antenna is activated and configured with the electrical and magnetic fields so that the PRRISM antenna EM wave will match the approaching solar plasma EM wave. At operation 1409, an antenna, such as antenna 100 in FIG. 9, directs a local electromagnetic wave to interact with the solar EM wave at the entry point of the polar cusp. And, at operation 1410, parameters of the local EM wave (e.g., frequency, polarization, power) are selected to direct a component of the solar plasma into the polar cusp in a uniform flow that maximizes a plasma flux at an exit point of the polar cusp to intercept the targeted space debris. The methods and apparatus described herein could be used for space propulsion.

The preceding description sets forth numerous specific details such as examples of specific systems, components, methods, and so forth, in order to provide a good understanding of the present disclosure. It will be apparent to one skilled in the art, however, that other examples may be practiced without these specific details. In other instances, well-known components or methods are not described in detail or are presented in simple block diagram form in order to avoid unnecessarily obscuring the present disclosure. Thus, the specific details set forth are merely non-limiting examples.

Although the operations of the methods herein are shown and described in a particular order, the order of the operations of each method may be altered so that certain operations may be performed in an inverse order or so that certain operation may be performed, at least in part, concurrently with other operations. In other examples, instructions or sub-operations of distinct operations may be performed in an intermittent or alternating manner.

The above description of illustrated examples of the invention, including what is described in the Abstract, is not intended to be exhaustive or to limit the invention to the precise forms disclosed. While specific examples are described herein for illustrative purposes, various equivalent modifications are possible within the scope of the disclosure, as those skilled in the relevant art will recognize. The word "example" or is used herein to mean serving as an example, instance, or illustration. Any aspect or design described herein as "example" is not necessarily to be construed as preferred or advantageous over other aspects or designs.

Rather, use of the word "example" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A system for removing space debris from near Earth orbit, comprising:
    a solar plasma sensor (SPS) to detect parameters of a solar electromagnetic (EM) wave and a solar plasma; a space debris sensor (SDS) to detect parameters of space debris;
    a satellite in communication with the SPS and positioned over an entry point of a polar cusp, the satellite comprising:
        an antenna to direct a local EM wave to interact with the solar EM wave at the entry point of the polar cusp;
        thrusters to aim the antenna at the solar cusp; and
        control systems to control an orientation of the antenna and to select parameters of the local EM wave to convert a turbulent magnetic flux of the solar EM wave to a laminar magnetic flux, wherein a component of solar plasma is directed into the polar cusp in a uniform flow that maximizes a plasma flux at an exit point of the polar cusp.

2. The system of claim 1, wherein the plasma flux in the polar cusp is operable to intercept and decelerate near-Earth orbit debris, wherein the near-Earth orbit debris is removed from orbit.

3. The system of claim 1, wherein the uniform flow comprises one or more of a linear laminar flow and a spiral laminar flow of the component of the solar plasma.

4. The system of claim 1, wherein the component of the solar plasma comprises positively charged ions.

5. The system of claim 1, wherein the component of the solar plasma comprises negatively charged electrons.

6. The system of claim 1, wherein the parameters of the local EM wave comprise power, frequency and polarization of the local EM wave.

7. A method for removing space debris from near Earth orbit, comprising:
    positioning a satellite over an entry point of a polar cusp;
    receiving, from a solar plasma sensor, parameters of a solar electromagnetic (EM) wave and a solar plasma;
    receiving, from a space debris sensor, parameters of targeted space debris;
    directing, with an antenna of the satellite, a local EM wave to interact with the solar EM wave at the entry point of the polar cusp by aiming the antenna at the polar cusp by using thrusters; and
    selecting parameters of the local EM wave to convert a turbulent magnetic flux of the solar EM wave to a laminar magnetic flux, wherein a component of the solar plasma is directed into the polar cusp in a uniform flow that maximizes a plasma flux at an exit point of the polar cusp.

8. The method of claim 7, wherein the plasma flux in the polar cusp is operable to intercept and decelerate near-Earth orbit debris, wherein the near-Earth orbit debris is removed from orbit.

9. The method of claim 7, wherein the uniform flow comprises one or more of a linear laminar flow and a spiral laminar flow of the component of the solar plasma.

10. The method of claim 7, wherein the component of the solar plasma comprises positively charged ions.

11. The method of claim 7, wherein the component of the solar plasma comprises negatively charged electrons.

12. The method of claim 7, wherein the parameters of the local EM wave comprise power, frequency and polarization of the local EM wave.

13. An apparatus, comprising a satellite configured to be positioned at an entry point of a polar cusp, the satellite further configured to receive parameters of a solar electromagnetic (EM) wave and parameters of a solar plasma from a solar plasma sensor, and to receive parameters of targeted space debris from a space debris sensor; the satellite comprising:
    an antenna configured to direct a local EM wave to interact with the solar EM wave at the entry point of the polar cusp;
    thrusters to aim the antenna at the solar cusp; and
    control systems to control an orientation of the antenna and to select parameters of the local EM wave to convert a turbulent magnetic flux of the solar EM wave to a laminar magnetic flux, wherein a component of solar plasma is directed into the polar cusp in a uniform flow that maximizes a plasma flux at an exit point of the polar cusp to intercept the targeted space debris.

* * * * *